United States Patent
Oda et al.

[11] Patent Number: 6,014,910
[45] Date of Patent: Jan. 18, 2000

[54] PROTECTIVE CAP-SYSTEM FOR BICYCLE CABLE

[75] Inventors: Hiromi Oda, Wakayama; Shinpei Okajima, Izumi; Masanori Sugimoto, Osakasayama, all of Japan

[73] Assignee: Shimano, Inc., Osaka, Japan

[21] Appl. No.: 08/908,727

[22] Filed: Aug. 7, 1997

Related U.S. Application Data

[60] Division of application No. 08/600,745, Feb. 13, 1996, Pat. No. 5,809,840, which is a continuation-in-part of application No. 08/502,938, Jul. 17, 1995, abandoned.

[30] Foreign Application Priority Data

| Feb. 14, 1995 | [JP] | Japan | 7-47910 |
| Feb. 24, 1995 | [JP] | Japan | 7-59989 |
| Jul. 6, 1995 | [JP] | Japan | 7-162779 |

[51] Int. Cl.[7] ............................................. F16C 1/10
[52] U.S. Cl. .................. 74/502.6; 74/502.4; 74/500.5; 74/501.5 R
[58] Field of Search ........................ 74/502.4, 502.6, 74/500.5, 501.5 R

[56] References Cited

U.S. PATENT DOCUMENTS

| 2,845,812 | 8/1958 | Pobar | 74/502.4 X |
| 3,248,882 | 5/1966 | Roosa | 74/502.4 X |
| 3,938,405 | 2/1976 | Sommerer | 74/501 R |
| 4,534,239 | 8/1985 | Heimann | 74/501 R |
| 4,621,937 | 11/1986 | Maccuaig | 403/197 |
| 4,685,350 | 8/1987 | Bauer et al. | 74/501 R |
| 4,787,263 | 11/1988 | Jaksic | 74/501.5 R |
| 4,833,937 | 5/1989 | Nagano | 74/501.5 R |
| 4,872,367 | 10/1989 | Spease | 74/502.6 |
| 4,887,482 | 12/1989 | Romano | 74/502.6 |
| 4,889,005 | 12/1989 | Crack | 74/502.4 X |
| 4,892,005 | 1/1990 | Nagano | 74/502.4 |
| 4,895,041 | 1/1990 | Cunningham | 74/502.4 |
| 4,963,050 | 10/1990 | Wendt et al. | 403/197 |
| 5,003,838 | 4/1991 | Pospisil et al. | 74/502.4 |
| 5,009,122 | 4/1991 | Chaczyk | 74/502.6 |
| 5,014,569 | 5/1991 | Kelley | 74/502.4 |
| 5,015,023 | 5/1991 | Hall | 294/102.1 |
| 5,018,251 | 5/1991 | Brown | 24/122.6 |
| 5,031,737 | 7/1991 | Dzioba et al. | 192/4 A |
| 5,105,682 | 4/1992 | Jung | 74/502.4 |
| 5,144,856 | 9/1992 | Roca | 74/501.5 |
| 5,172,878 | 12/1992 | Lederman | 248/73 |
| 5,199,320 | 4/1993 | Spease et al. | 74/502.4 |
| 5,363,719 | 11/1994 | Johnson et al. | 74/502.4 |
| 5,443,134 | 8/1995 | Gajek et al. | 188/344 |
| 5,630,338 | 5/1997 | Patterson et al. | 74/502.6 |

FOREIGN PATENT DOCUMENTS

| 0183949 A1 | 6/1986 | European Pat. Off. . |
| 0 517 538 A1 | 12/1992 | European Pat. Off. ......... F16C 1/12 |
| 2852451 | 6/1980 | Germany ................ F16C 1/26 |
| 56-146121 | 11/1981 | Japan ................... F16C 1/24 |
| 60-23552 | 7/1985 | Japan ................... F16C 1/24 |
| 61-166221 | 10/1986 | Japan ................... F16C 1/10 |
| 63-173512 | 11/1988 | Japan ................... F16C 1/10 |
| 64-44332 | 2/1989 | Japan ................... B60K 26/04 |
| 2-2727 | 1/1990 | Japan ................... G05G 25/04 |
| 2-21320 | 2/1990 | Japan ................... F16C 1/10 |
| 2-134409 | 5/1990 | Japan ................... F16C 1/10 |
| 4-134793 | 12/1992 | Japan ................... B62M 25/02 |
| 5-50978 | 3/1993 | Japan ................... B62M 25/02 |
| 5-272523 | 10/1993 | Japan ................... F16C 1/10 |
| 837626 | 6/1969 | United Kingdom . |
| 2025000 | 1/1981 | United Kingdom ............ F16C 1/26 |
| 2081411A | 2/1982 | United Kingdom ............ F16C 1/22 |
| 2151758A | 7/1985 | United Kingdom ............ G05G 7/00 |
| 2241999 | 9/1991 | United Kingdom . |
| 2275316A | 8/1994 | United Kingdom . |
| 93/07397 | 4/1993 | WIPO . |

OTHER PUBLICATIONS

European search report for EP 96301016.0, dated Oct. 15, 1997.

*Primary Examiner*—Vinh T. Luong
*Attorney, Agent, or Firm*—James A. Deland

[57] ABSTRACT

A cap is provided for fitting to a bicycle control cable of the type having an inner cable slidingly disposed within an outer casing where the outer casing terminates for exposing a portion of the inner cable. The cap has a first section defining a first section opening for fitting the outer casing therein. A protective cover extends along the exposed portion of the inner cable and has a first end disposed over the cap.

11 Claims, 19 Drawing Sheets

FIG. 7
FIG. 8
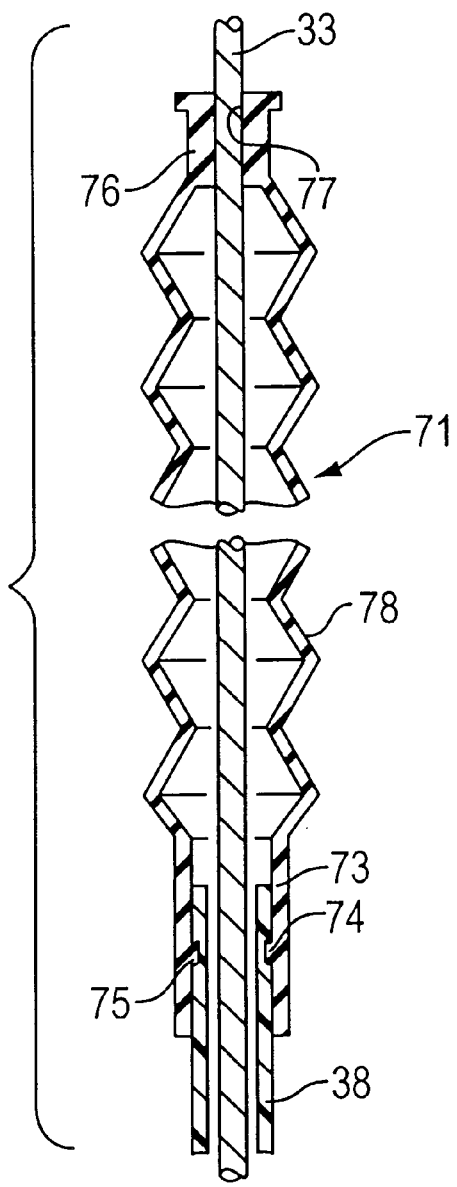
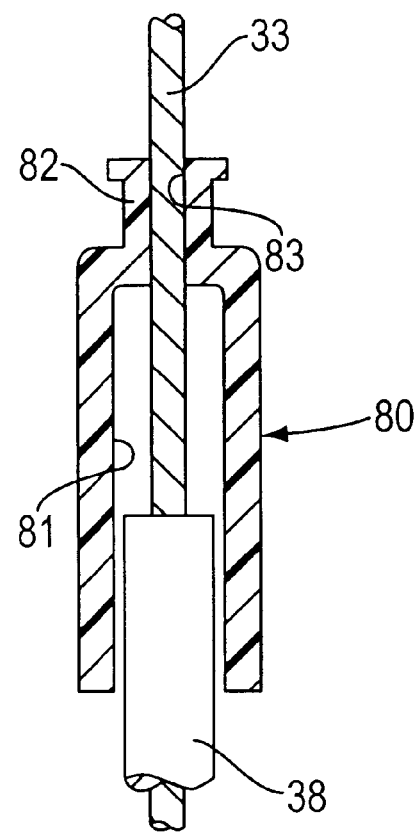

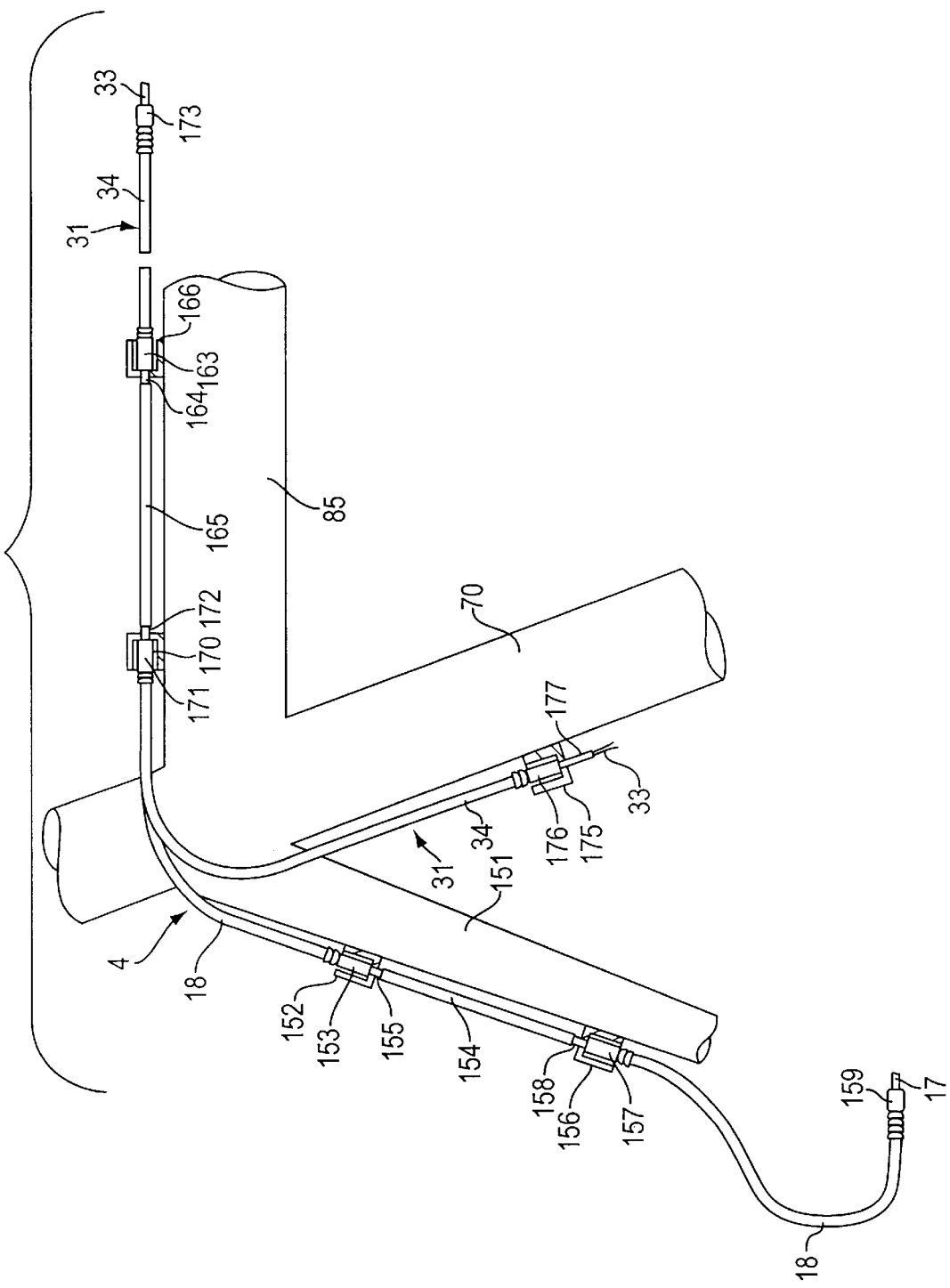

PROTECTIVE CAP-SYSTEM FOR BICYCLE CABLE

This is a division of application Ser. No. 08/600,745 filed Feb. 13, 1996, now U.S. Pat. No. 5,803,840 issued date Sep. 22, 1998 which is a continuation-in-part of application Ser. No. 08/502,938 filed Jul. 17, 1995, now abandoned.

BACKGROUND OF THE INVENTION

The present invention is directed to an apparatus for preventing contamination of a bicycle control cable and, more specifically, to a protective cap and cover system for preventing deterioration of the cable as a result of the penetration of foreign matter.

Bicycle front and rear brakes and derailleurs are operated by control cables connected to shift lever units or brake levers located on the handle bars. Control cables are constructed of an inner cable that is slidingly disposed within an outer casing. The inner cable is made by twisting several steel wires together. The outer casing is ordinarily constructed of a synthetic resin cable liner, a band steel strip that is spirally wound around the cable liner, and a synthetic resin jacket that is used to cover the outer circumference of the band steel strip. The outer casing usually terminates at a position midway between the shifting lever unit or brake lever and the rear or front derailleur, thus leaving the inner cable exposed.

The inner cable is exposed for the following reasons. A gap typically is formed between the outer circumferential surface of the inner cable and the inner circumferential surface of the cable liner to allow the inner cable to slide more easily. In the case of longer cables, however, the friction force increases between the inner cable and cable liner, imposing a burden on the operation of the shift lever unit or the brake lever. The outer casing is therefore removed at a certain point to prevent such excessive friction.

However, foreign objects, such as mud, dust, etc., penetrate from the exposed end of the cable into the gap, thus increasing the slide resistance between the inner cable and cable liner. As a result, the brakes or shift mechanism, etc., becomes more difficult to operate. Furthermore, foreign objects such as clay and sand in mud act as grinding materials, causing the cable liner and inner cable to wear more quickly. Contamination of the gap between the inner cable and the outer casing thus should be avoided wherever possible.

The applicant has already proposed protective end caps for outer cables in Japanese Laid-Open Patent Application 63-173512. Such caps are attached to outer casings in order to prevent the penetration of foreign objects inside the cable. However, the use of many such caps on a single control cable increases the resistance in operating the inner cable. Furthermore, because the cable is exposed, the cable can deteriorate from moisture and other contaminants.

SUMMARY OF THE INVENTION

The present invention is directed to a protective cap system for a bicycle control cable wherein the gap between the inner cable and the outer casing is sealed from contaminants without adding excessive friction to the system. The system may be added to existing bicycles without replacing the entire existing control cable system.

In one embodiment of the present invention, a cap is provided for fitting to a bicycle control cable of the type having an inner cable slidingly disposed within an outer casing, where the outer casing terminates for exposing a portion of the inner cable. The cap has a first section defining a first section opening for fitting the outer casing therein. A protective cover extends along the exposed portion of the inner cable and has a first end disposed over the cap.

The protective cap system may have many different forms. For example, an end face of the cap may define an end face opening, and the first end of the protective cover may be fitted within the end face opening. The cap may include a second section having a diameter smaller than a diameter of the first section. The first and second sections may be formed as separate components, or else they may be formed as one piece. This type of cap is particularly useful in a bicycle having cap retainers fitted to the frame. When used with such a bicycle, the first section of the cap may be fitted within the cap retainer, and the second section may protrude beyond the cap retainer. In any event, the protective cover is typically fitted to the second section of the cap.

The protective cover also may have many different forms. For example, the protective cover may comprise a first tubular section fitted on an exposed section of the inner cable, and a second tubular section disposed on the cap. In addition, a second protective cover may be provided wherein the second protective cover has a first end fitted to the inner cable and a second end disposed over the first protective cover. In another embodiment, the protective cover may comprise a main body having a first end mounted to an end of the outer casing and a second end fit over the inner cable for defining a gap between the second end and the inner cable. In this embodiment, the main body defines a space which prevents water from entering the insertion hole. This particular embodiment not only allows the easy expulsion of invading water to the outside of the protective cap by natural evaporation without any soiling of the inner cable in cases where water such as rain water or dew, etc., has invaded the interior of the protective cap, but also reliably prevents the entry of accumulated water into the inner cable insertion hole even in cases where the protective cap with accumulated water inside is tilted downward together with the control cable when the control cable is unintentionally swung downward.

The present invention also has particular utility in a bicycle control cable of the type having an inner cable slidingly disposed within a first outer casing segment and a second outer casing segment, wherein the first outer casing segment and the second outer casing segment are spaced apart from each other for exposing a portion of the inner cable. In this case, first and second caps are fitted to the ends of the first and second segments of the control cable so that the first and second caps face each other. The protective cover is disposed over the exposed portion of the inner cable and has a first end fitted to the first cap. The second end of the protective cover may extend to the second cap with or without connecting with the second cap.

BRIEF DESCRIPTION OF THE DRAWINGS

FIG. 7 is a cross sectional view of a particular embodiment of a protective cover according to the invention for the front derailleur;

FIG. 8 is a cross sectional view of an alternative embodiment of a protective cover according to the invention for the front derailleur;

FIG. 22 shows an alternative embodiment of a protective cap system according to the invention for bicycle control cables where the control cables extend along the top tube of the bicycle.

DETAILED DESCRIPTION OF THE EMBODIMENTS

Figure 1:
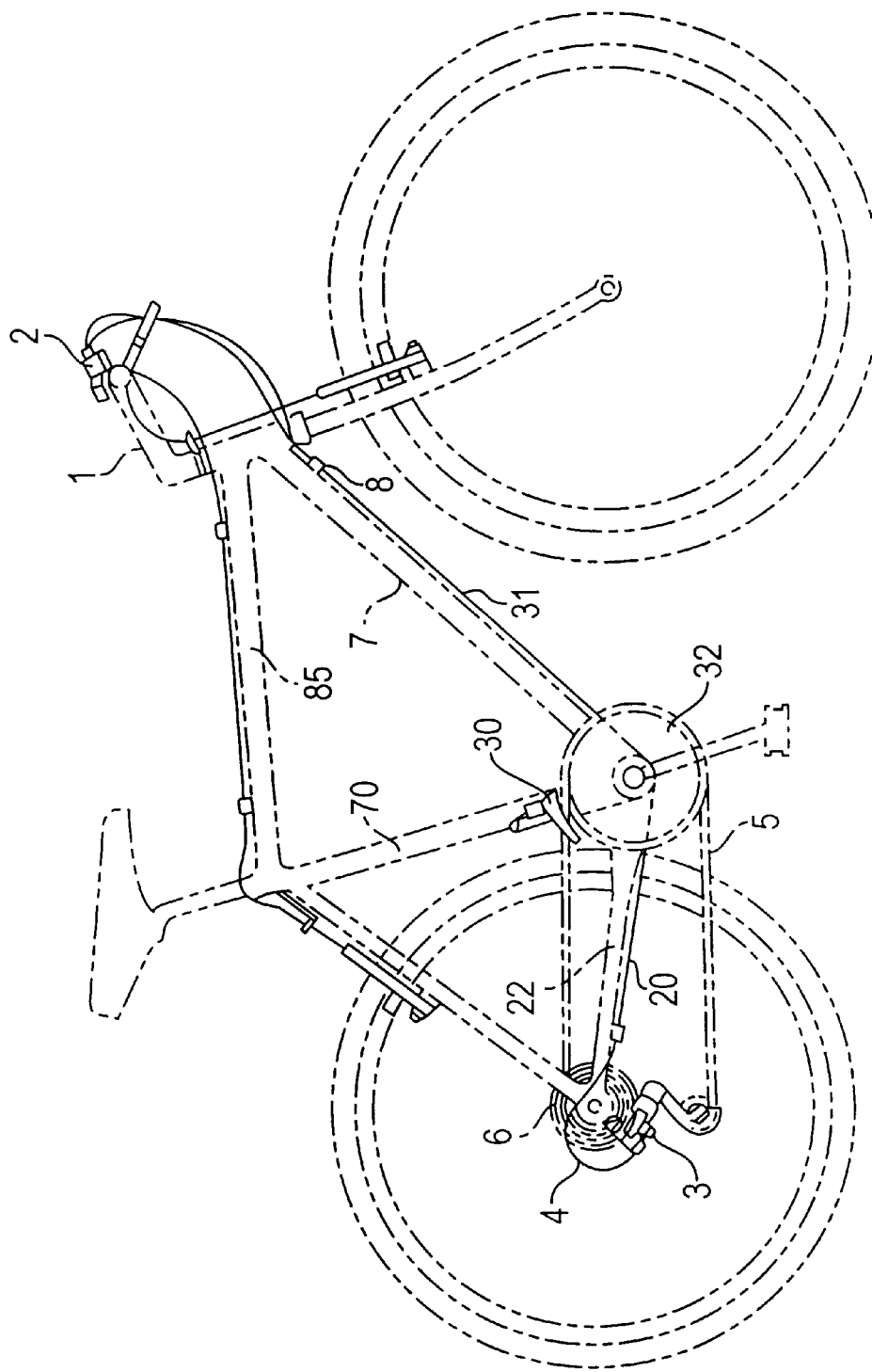
FIG. 1 shows a particular arrangement of bicycle control cables on a bicycle.

FIG. 1 shows a particular arrangement of bicycle control cables on a bicycle. A rear shift lever unit 2 and front shift lever unit (not shown in figure) are set up on the handle bars 1. A rear derailleur 3 is connected via a rear derailleur cable 4 to the rear shift lever unit 2. The rear derailleur 3 shifts the chain 5 to select the rear sprocket 6 with the optimal number of teeth from among a plurality of rear sprockets 6. A front derailleur 30 is connected via a front derailleur cable 31 to the front shift lever unit. The front derailleur 30 shifts the chain 5 to select the front sprocket 32 with the optimal number of teeth from among a plurality of front sprockets 32. The structure and function of these components are well known, and a detailed description of them will thus be omitted.

Figure 3:
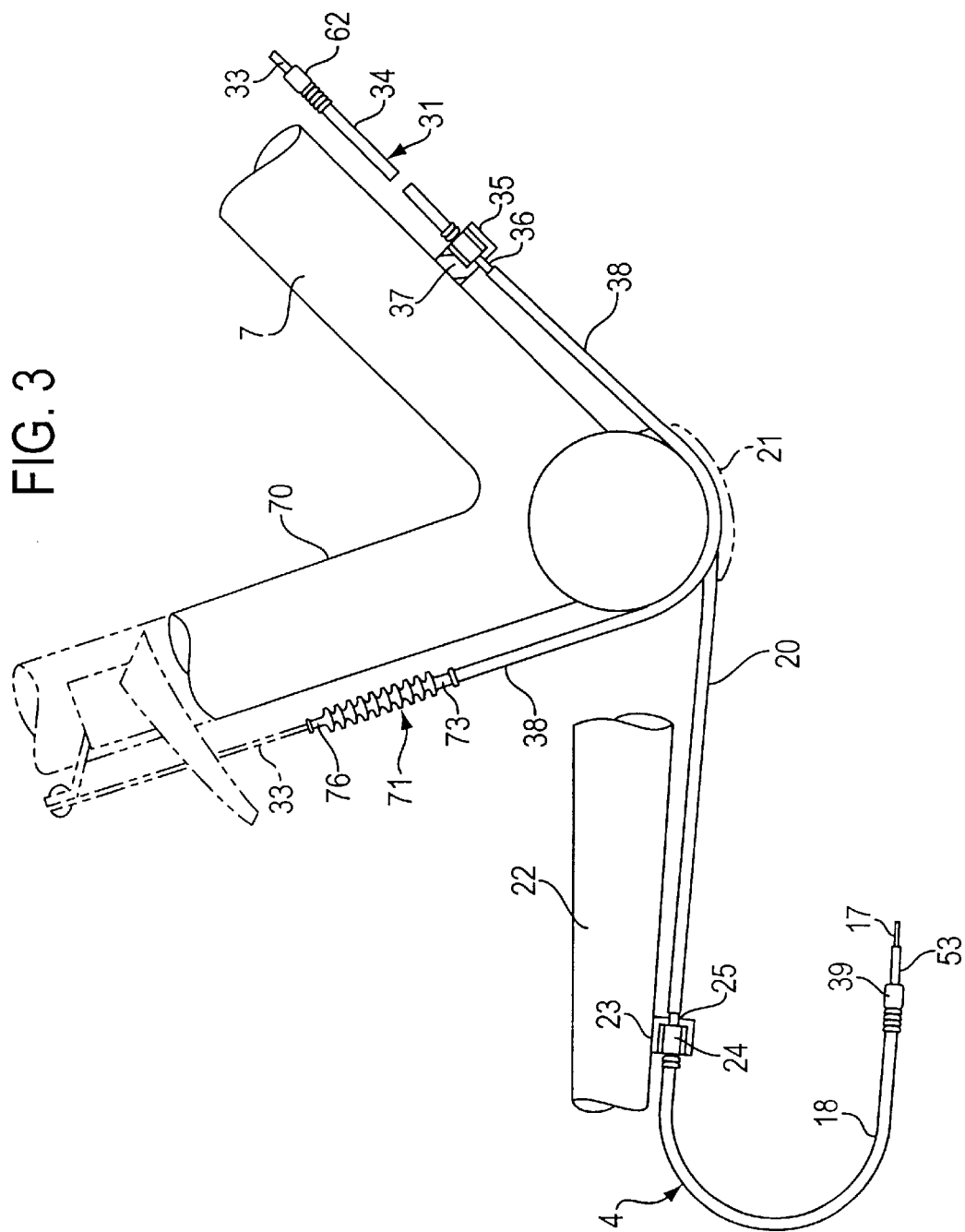
FIG. 3 shows a particular embodiment of a protective cap system according to the invention for bicycle control cables where the control cables extend along the down tube of the bicycle.

FIG. 3 shows a particular embodiment of a protective cap system according to the invention for bicycle control cables where the control cables extend along the down tube of the bicycle. A description of a particular embodiment of a protective cap system for the rear derailleur cable 4 will be described first.

Figure 2:
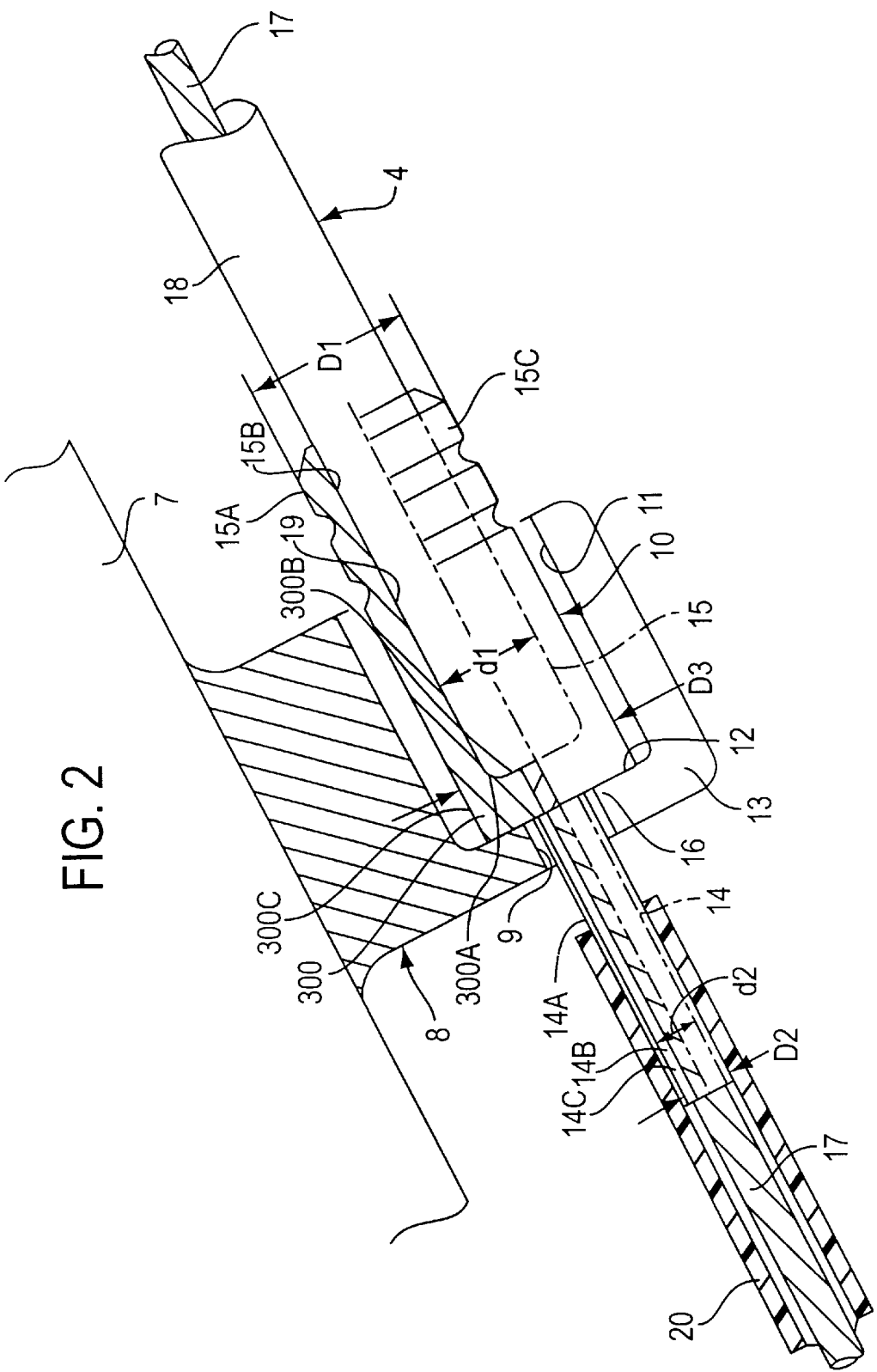
FIG. 2 is a partial cross sectional view of a cap receiver integrally fixed to the bicycle frame.

At an intermediate location along the rear derailleur cable 4, e.g., at the location of a cap receiver 8 (FIG. 2) affixed to the slanted frame 7, the outer cable 18 is removed. Cap receiver 8 is located adjacent to a cap receiver 37 shown in FIG. 3. FIG. 2 is an enlarged cross section of cap receiver 8. The cap receiver 8 is designed to fix and support a tubular member in the form of a nose cap 10. The cap receiver 8 has a first cap receiver opening (tubular inner hole) 11 with a bottom cap receiver surface 12. A slit 13 is formed in the axial direction in the inner hole 11. The slit 13 is intended to be used when the rear derailleur cable 4 is assembled with the bicycle and is intended to allow only the inner cable 17 to pass through.

The nose cap 10 includes, as one piece, a first section (large diameter component) 15 and a second section (small diameter component) 14. The first section large diameter component 15 has a first section outer peripheral surface 15a and a first section inner peripheral surface 15b defining a first section opening 19. The second section small diameter component 14 has a second section outer peripheral surface 14a and a second section inner peripheral surface 14b defining a second section opening 14c. In this embodiment, a diameter D2 of the entire second section outer peripheral surface 14a is constant and less than a diameter D1 of the entire first section outer peripheral surface 15a, and a diameter d2 of the entire second section inner peripheral surface is smaller than a diameter d1 of the entire first section inner peripheral surface 15b. A wall section 300 is located between the large diameter component 15 and the small diameter component 14, wherein one side of the wall section 300 defines an external abutment 300a and an opposite side of the wall section 300 defines an internal abutment 300b opposite the external abutment 300a. At least a portion of external abutment 300a is perpendicular to first section outer peripheral surface 15a and second section outer peripheral surface 14a, and at least a portion of internal abutment 300b is perpendicular to first section inner peripheral surface 15b and second section inner peripheral surface 14b. A diameter D3 of an outer peripheral surface 300c of wall section 300 is not greater than diameter D1 of first section outer peripheral surface 15a at a free end 15c of large diameter component 15 not covered by cap receiver 8.

Large diameter component 15 is disposed within inner hole 11 of cap receiver 8, and small diameter component 14 extends through a small diameter cap receiver opening (insertion hole) 9 formed in a cap receiver surface 12 at the bottom of cap receiver 8. In this embodiment, external abutment 300a abuts against cap receiver surface 12. Slit 13 is connected to insertion hole 9. Outer casing 18 of rear derailleur cable 4 is fitted within first section opening 19 and terminates at internal abutment 300b, and a first portion of inner cable 17 not covered by outer casing 18 extends through second section opening 14c.

A protective cover 20 is placed around a second portion of the inner cable 17 of the rear derailleur cable 4 not covered by the outer casing 18. The protective cover 20 may be made of a synthetic resin, rubber, metal tube, or the like. A first end of the protective cover 20 is fitted to the small diameter component 14 of the nose cap 10. Because the inner cable 17 is thus covered with the protective cover 20, foreign objects such as mud do not penetrate into the gap between the small diameter component 14 and inner cable 17.

A cap receiver 23 having the same structure as the cap receiver 8 described above is opposably placed and fixed to the bottom part of the bottom horizontal frame 22 (see FIG. 3), and a nose cap 24 having the same structure as nose cap 10 described above is inserted into the cap receiver 23. The protective cover 20 is guided by a cable guide 21 fixed to the bottom of the frame and extends to the nose cap 24. The end of the protective cover 20 is fitted around the small diameter component 25 of the nose cap 24. The protective cover 20 and cable guide 21 do not slide relative to each other, but the inner cable 17 and protective cover 20 do slide relative to each other. There is thus little slide resistance when a lubricant is admixed with the synthetic resin protective cover 20.

One end of another segment of the outer casing 18 of the rear derailleur cable 4 is fitted to the nose cap 24, and the other end is fitted to a nose cap 39.

Figure 4:
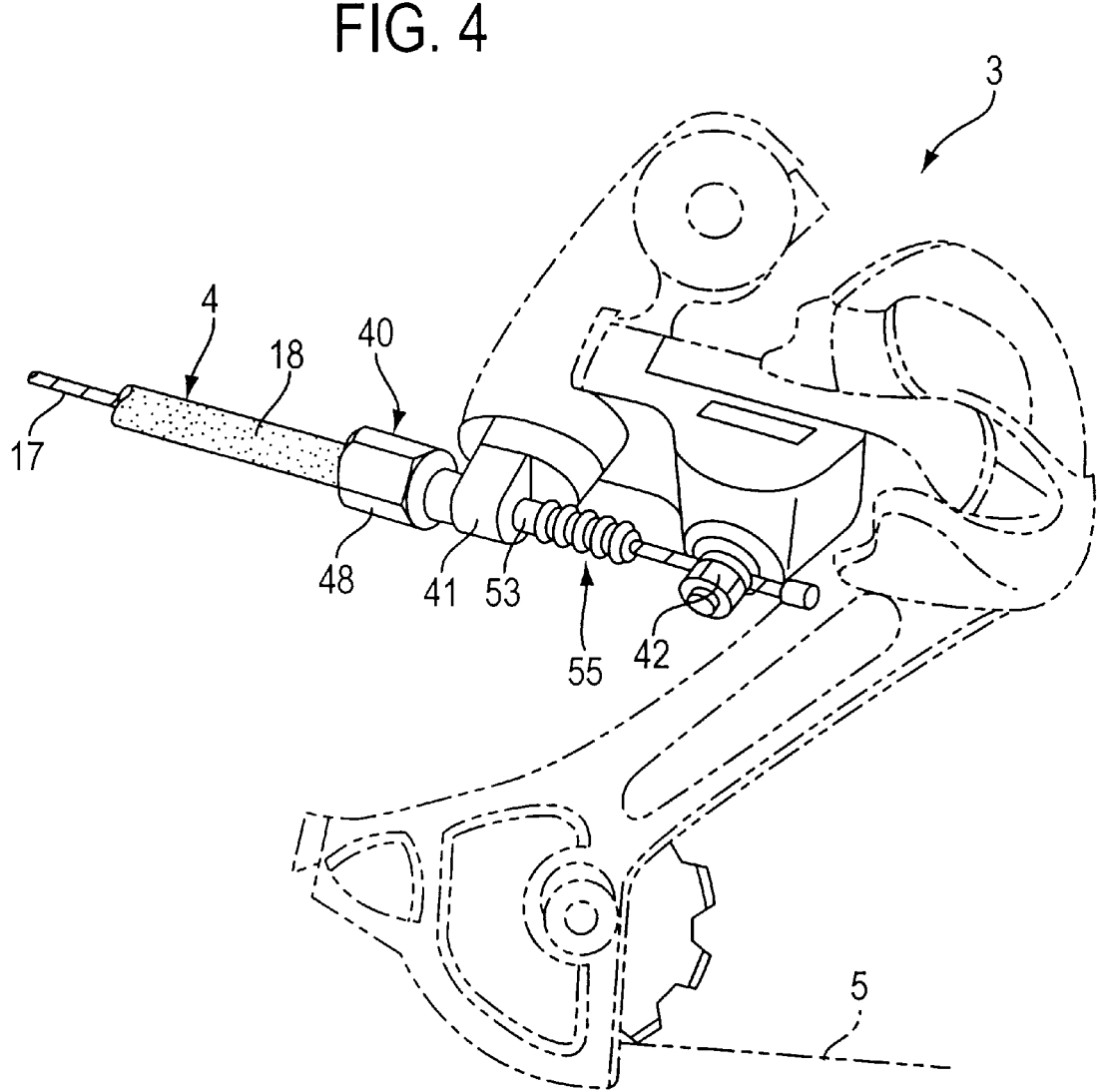
FIG. 4 shows a particular embodiment of a protective cap system employed at the rear derailleur of the bicycle.
Figure 5:
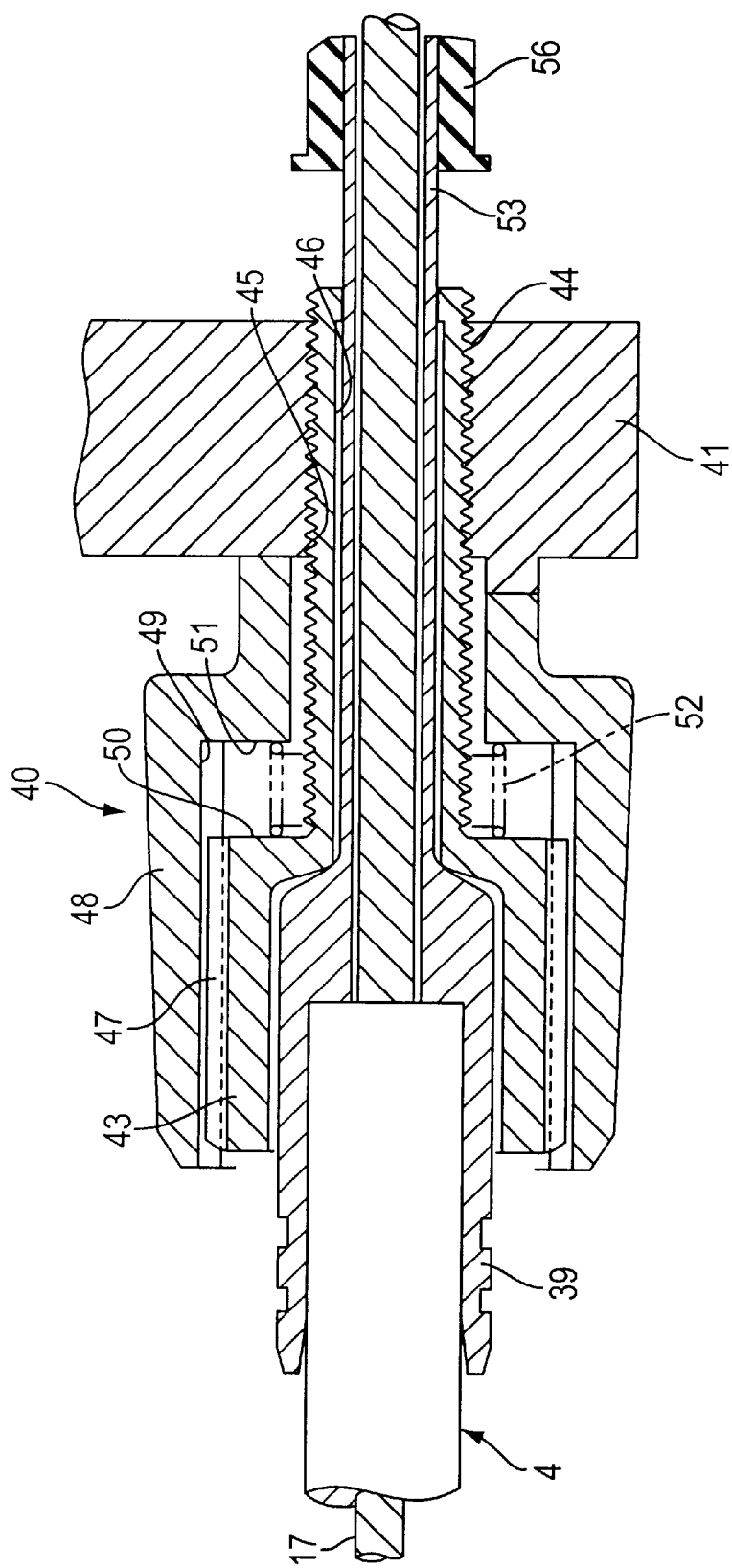
FIG. 5 is a cross sectional view of a particular embodiment of the cable adjusting barrel unit shown in FIG. 4.

FIG. 4 illustrates the appearance of the rear derailleur 3 and rear derailleur cable 4 when they are connected, and FIG. 5 is a cross section of a cable adjusting barrel unit 40 located at the bracket 41 of the rear derailleur 3. The outer casing 18 of rear derailleur cable 4 is connected to the cable adjusting barrel unit 40, and the tip of the inner cable 17 of the rear derailleur cable 4 is fixed with a cable-fixing bolt unit 42.

As shown in FIG. 5, the screw component 44 of the adjusting bolt 43 of the cable adjusting barrel unit 40 is screwed into the thread 45 formed at the bracket 41. A through hole 46 is formed in the center of the adjusting bolt 43, and a spline shaft 47 is formed around the head of the adjusting bolt 43. This spline shaft 47 is inserted into a spline hole 49 formed in a tubular adjusting handle 48, and is movably engaged in the axial direction. The adjusting bolt 43 is rotated and driven via the connection of the spline hole 49 and spline shaft 47 when the adjusting handle 48 is rotated while held between the fingers.

The rotation of the adjusting handle 48 allows the adjusting bolt 43 to be screwed into the thread 45 of the bracket 41 and thus to be moved in the axial direction, producing reciprocal movement between the inner cable 17 and outer casing 18. A coil spring 52 is interposed between the end face 50 of the adjusting bolt 43 and the bottom surface 51 of the spline hole 49. The coil spring 52 presses the adjusting handle 48 onto the bracket 41 of the rear derailleur 3. The small diameter component 53 of the nose cap 39 passes through the center hole 46 of the adjusting bolt 43.

Figure 6:
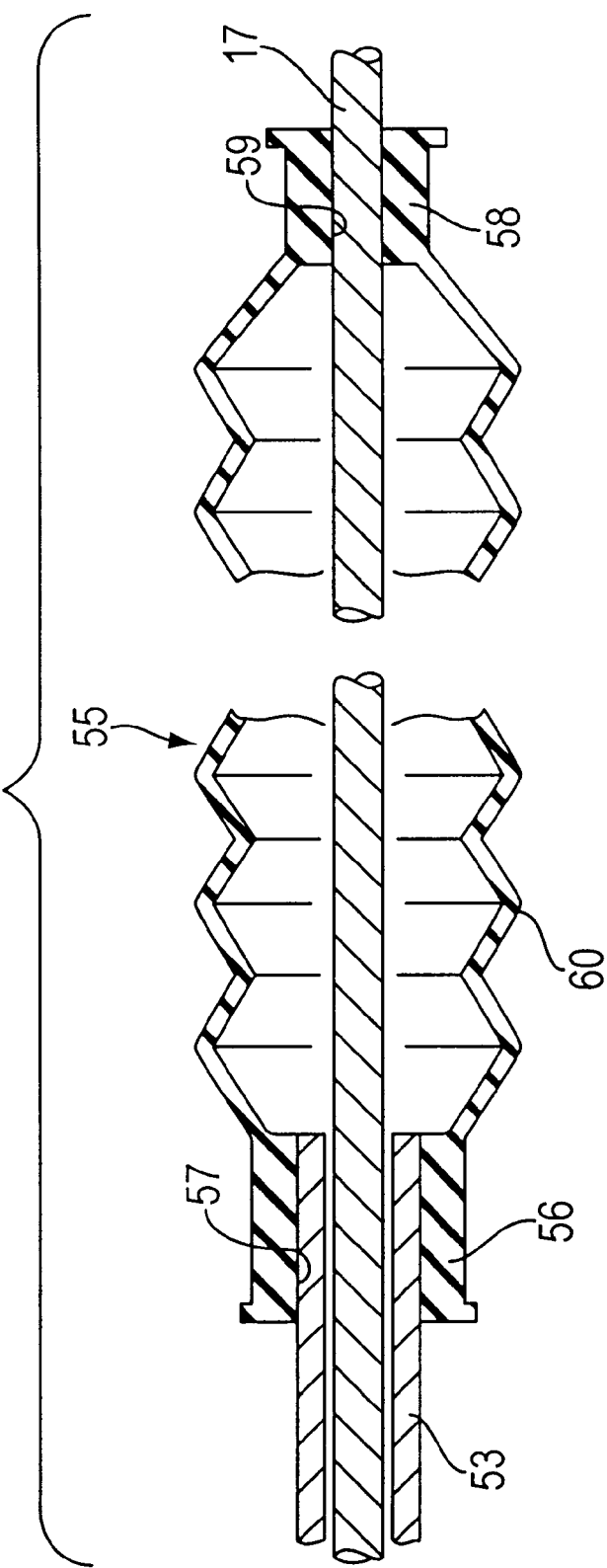
FIG. 6 is a cross sectional view of a particular embodiment of a protective cover according to the invention for the rear derailleur.

FIG. 6 is a cross section of a bellows tube 55 shown in FIG. 4. The connection fixing component 56 at one end of the bellows tube 55 is fitted around and fixed to the small diameter component 53 of nose cap 39. The inner hole 57 of the connection fixing component 56 is made with a diameter that is smaller than the outside diameter of the small diameter component 53, but since it is made of a flexible material, it can be fitted around and fixed to the small diameter component 53. The bellows tube 55 may be made of a synthetic rubber, synthetic resin elastomer, or the like. The connection fixing component 58 at the other end of the bellows tube 55 is fixed to the inner cable 17. The thin walled component 60 of the bellows tube 55 is extensible and retractable, following the movement of the inner cable 17.

The inner hole 59 of the connection fixing component 58 is made with a diameter that is smaller than the outside diameter of the inner cable 17, but since it is made of a flexible material, it can be fitted around and fixed to the inner cable 17. Since the connection fixing components 56 and 58 of the bellows tube 55 are extended and are fitted around the small diameter component 53 and the inner cable 17, leaving no gap between them, no foreign objects or the like penetrate through these connection fixing components 56 and 58, and with little friction resistance against the movement of the inner cable 17.

The end of the rear derailleur cable 4 at the rear shift lever unit 2 is located on the handle bars 1, with little possibility of foreign objects penetrating therefrom, so an ordinary outer casing may be used. Of course, to prevent the penetration of any foreign objects from this location too, a shield outer casing described below with reference to FIG. 9 may be used. Thus, it should be apparent from the above description that no foreign objects or the like can penetrate from any position along the rear derailleur cable 4.

A description of a particular embodiment of a protective cap system for the front derailleur cable 31 will now be described.

The front derailleur 30 is connected to the front shift lever unit (not shown in figure) via the front derailleur cable 31 (see FIG. 3). The front derailleur 30 shifts the chain 5 and shifts gears by engaging the necessary front sprocket 32 from among a plurality of front sprockets 32. The structure and function of these components are well known, so a detailed description of them will thus be omitted.

The end of the front derailleur cable 31 connected to the front derailleur 30 has no outer casing 34 as shown in FIG. 3. A nose cap 35 having a small diameter component 36 is fitted around one end of the outer casing 34. The nose cap is retained in a cap receiver 37 that is attached to the slanted frame 7. The structure and function of the cap receiver 37 is the same as that of the cap receiver 8, making any further description unnecessary.

One end of the protective cover 38 is fitted around the small diameter component 36, is guided by the cable guide 21, and extends upward along the vertical frame 70. The inner cable 33 inside the protective cover 38 is connected to the front derailleur 30. One end 73 of the bellows tube 71 is fitted to the other end of the protective cover 38, and the other end 76 of the bellows tube 71 is fitted to the inner cable 33. The bellows tube 71 may be made of a rubber, synthetic resin elastomer, or the like, and is extensible and retractable.

FIG. 7 is a cross sectional view of bellows tube 71. The connection fixing component 73 at one end of the bellows tube 71 is fitted around and fixed to the protective cover 38. An inner circumferential protrusion 74 is formed along the inner circumferential surface of the connection fixing component 73. The inner circumferential protrusion 74 is inserted into and fixed to an outer circumferential groove 75 formed around the protective cover 38. A connection fixing component 76 is formed at the other end of the bellows tube 71. The inner hole 77 of the connection fixing component 76 is fitted around and connected to the inner cable 33.

The inner holes of the connection fixing components 73 and 76 of the bellows tube 71 have an inside diameter that is smaller than the outside diameters of the protective cover 38 and the inner cable 33, constricting the outer circumference of the protective cover 38 and inner cable 33, so that no foreign objects or the like penetrate through the connected parts. When the inner cable 33 is driven, the thin walled component 78 of the bellows tube 71 is accordingly extended or retracted, with little resistance, so that no foreign objects penetrate through the connection parts of the connection fixing components 73 and 76 of the bellows tube 71 into the front derailleur cable 31.

FIG. 8 is a cross sectional view of an alternative embodiment of a protective cap which may be used in place of bellows tube 71. The bellows tube 71 in the FIG. 7 comprised an extensible and retractable thin walled component 78. However, the protective cap 80 in FIG. 8 is entirely shaped in the form of a tube and may be made of a synthetic rubber or synthetic resin elastomer. A tubular hole 81 is formed in the interior. There is a gap between the tubular hole 81 and the outer periphery of the protective cover 38, allowing the protective cap 80 and the protective cover 38 to move relative to each other. Alternatively, they may also slide with no gap. At one end of the protective cap 80 is formed a connection fixing component 82 formed with a small diameter. The inner hole 83 of the connection fixing component 82 is fitted and fixed to the inner cable 33. The inner hole 83 is smaller than the outside diameter of the inner cable 33, but since the protective cap 80 is made of an elastic material, it can still be fitted by pressure.

Figure 9:
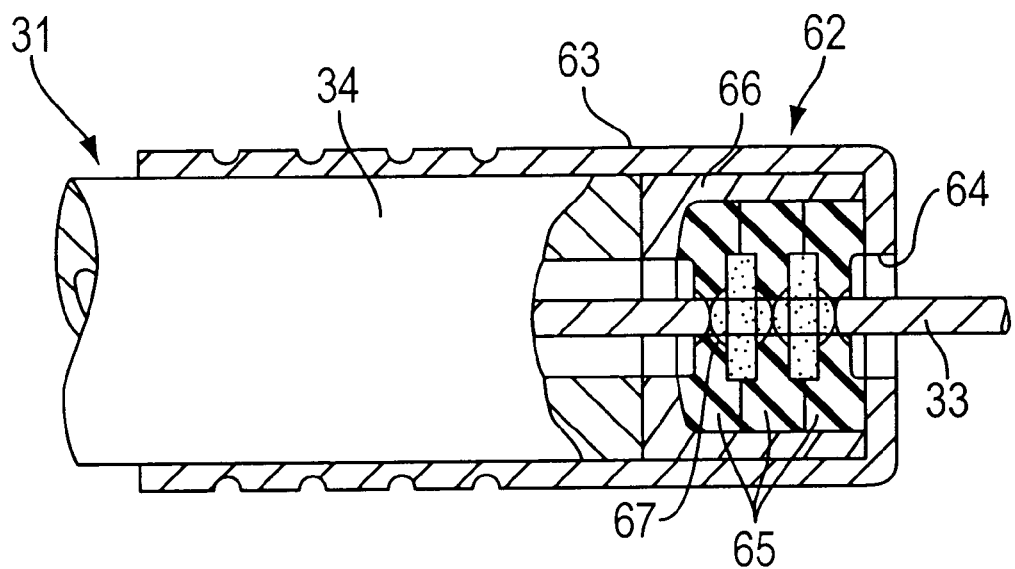
FIG. 9 is a cross sectional view of a shield cap.

A well-known shield cap 62 may be fitted on the outer casing 34 of the front derailleur cable at the front shift lever. FIG. 9 is a cross sectional view of shield cap 62. The shield cap 62 may be made of a synthetic resin or metal. It has a pipe-shaped cap main body 63, the bottom face of which is furnished with a hole 64 to allow the inner cable 33 to pass through. Three seal members 65 are lined up via a retaining component 66 inside the cap main body 63. An inner hole 67 through which the inner cable 33 is passed is located in the center of the seal members 65.

The diameter of the inner hole 67 is smaller than the outside diameter of the inner cable 33, but since the seal members 65 are made of a flexible material such as rubber or a synthetic resin elastomer, the inner cable 33 can pass through the inner hole 67, and the outer peripheral surface of the inner cable 33 can slide along the inner hole 67 of the seal members 65 so as to remove foreign objects and to prevent them from penetrating inside. The specific structure and function of the shield cap 62 are well known from Japanese Laid-Open Utility Model Application 63-173512, making a detailed description unnecessary. If desired, a shield cap 62 also may be employed with the rear derailleur in place of cap 39.

It should be apparent from the description above that no foreign objects or the like can penetrate from any location along the front derailleur cable 31.

Figure 10:
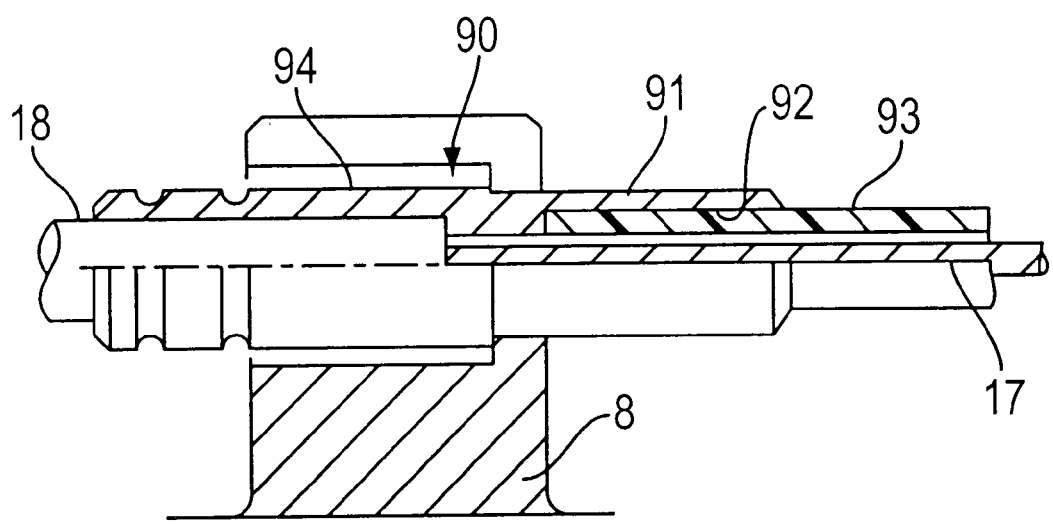
FIGS. 10–14 are partial cross sectional views of alternative embodiments of a protective cap system according to the present invention.

FIG. 10 is a cross sectional view of an alternative embodiment of a protective cap system according to the present invention. This embodiment, as well as the other embodiments described below, may be used in place of or in addition to the nose caps described above. As shown in FIG. 10, one end of a protective cover 93 is fitted into the inner circumferential surface of the inner hole 92 of the small diameter component 91 of the nose cap 90. The outer diameter of the small diameter component 91 of the nose cap 90 tends to be larger than in the previous embodiments. In this embodiment, the diameter of the protective tube 93 should be as small as possible. The outer casing 18 of rear derailleur cable 4 may be inserted inside the large diameter component 94.

Figure 11:
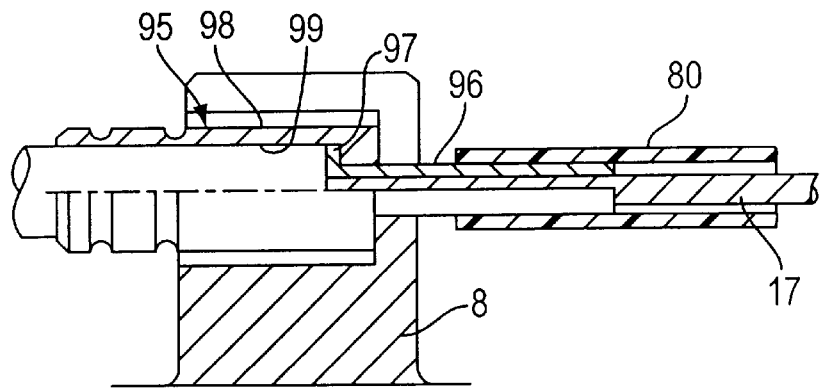

FIG. 11 is a cross sectional view of another alternative embodiment of a protective cap system according to the present invention. As shown in FIG. 11, a nose cap 95 is constructed of a separate small diameter component 96 and large diameter component 98. A flange 97 is formed at one end of the small diameter component 96, and the flange 97 is inserted into the inner circumferential hole 99 of the large diameter component 98. The nose cap 95 in this embodiment has a greater number of parts, but since it conforms to the bending of the inner cable 17, there is less resistance in the operation of the inner cable.

Figure 12:
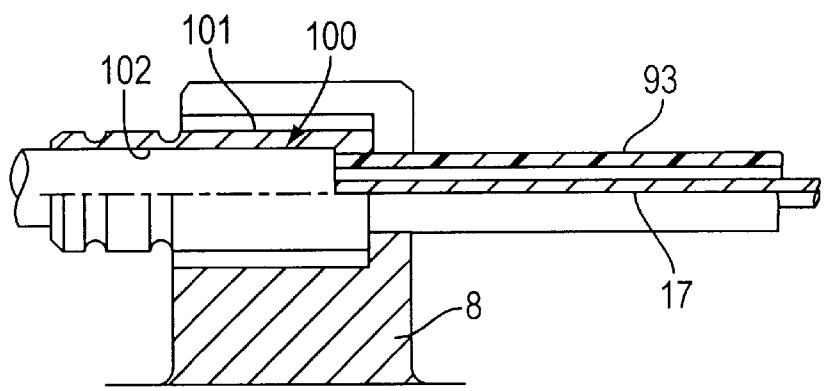

FIG. 12 is a cross sectional view of another alternative embodiment of a protective cap system according to the present invention. As shown in FIG. 12, a nose cap 100 is a type with no small diameter component. Instead, one end of a protective cover 93 is directly inserted into the inner hole 102 of the large diameter component 101. The structure of this embodiment is simpler.

Figure 13:
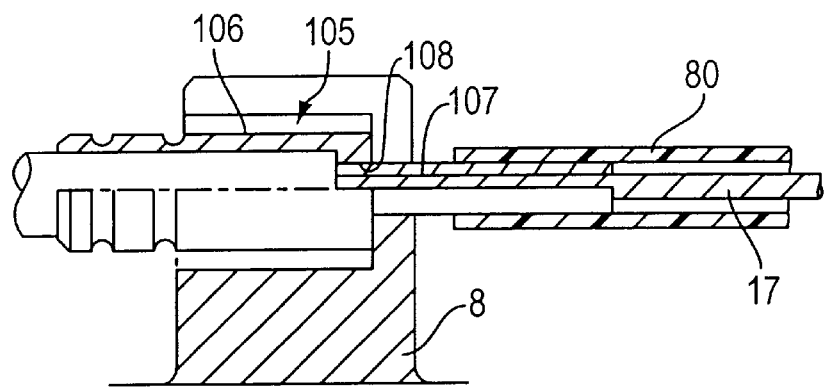

FIG. 13 is a cross sectional view of another alternative embodiment of a protective cap system according to the present invention. In the nose cap 105 shown in FIG. 13, the flange 97 of the nose cap 95 shown in the embodiment of FIG. 11 has been removed. One end of the small diameter component 107 is inserted into the insertion hole 108 at the tip of the large diameter component 106. The nose cap 105 in this embodiment has a greater number of parts, but since it conforms to the bending of the inner cable 17, there is less resistance in the operation of the inner cable.

Figure 14:
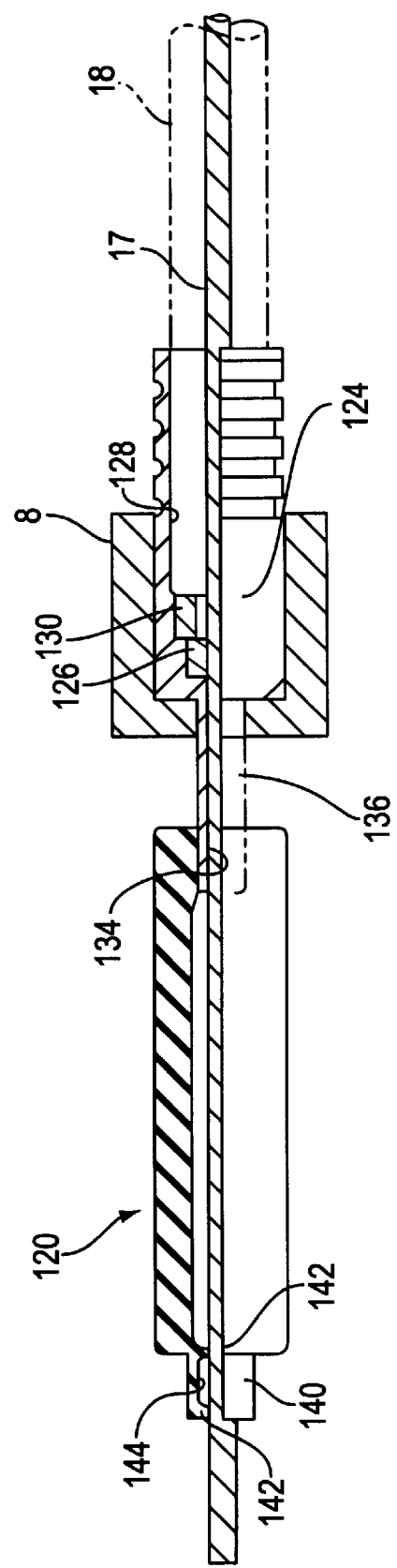

FIG. 14 is a cross sectional view of another alternative embodiment of a protective cap system according to the present invention. As shown in FIG. 14, the protective cover 120 is entirely shaped in the form of a tube and may be made of a synthetic rubber or synthetic resin elastomer. A cap receiver 8 fixed to the frame fixes and supports the nose cap 124. An O-shaped shield ring 126 is inserted into the inner hole 128 of the nose cap 124. The shield ring 126 is in contact with the outer periphery of the inner cable 17, thus preventing foreign objects from penetrating. A ring-shaped floor plate 130 is inserted into the inner hole 128 to fix the shield ring 126 and to support the tip of the outer casing 18.

A first end of protective cover 120 is fitted to the small diameter component 136 of the nose cap 124. The inner hole 134 of protective cover 120 has a diameter that is smaller than the small diameter component 136, allowing the inner hole 134 of the protective cover 120 to be fitted to the small diameter component 136 so as to keep it air-tight. A small diameter component 140 is formed at the second end of the protective cover 120. Two inner circumferential protrusions 142 are formed along the inner circumferential surface in the inner hole 144 of the small diameter component 140 of the protective cover 120. The inner circumferential protrusions 142 maintain the air-tightness around the inner cable 17.

Since the protective cover 120 of this embodiment is made of rubber, it is characteristically readily fitted to the small diameter component 136 the nose cap 124, and it is easily manufactured since it can in its entirety be integrally formed. The protective cover 120 can adapt to the flexing of the inner cable 17, and the inner circumferential protrusions 142 readily adapt to the movement of the inner cable 17 and thus have exceptional durability.

Figure 15A:
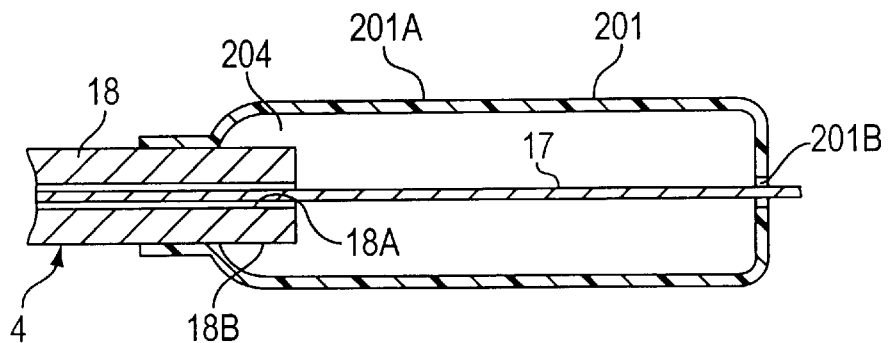
FIGS. 15(A–C) are cross-sectional views of another type of a protective cap for a control cable according to the present invention.

FIGS. 15(A–C) are a cross-sectional views of another type of protective cover for a control cable according to the present invention. In FIG. 15(A), 201 indicates a protective cover for a derailleur cable, which is formed roughly in the overall shape of a bottle from a rubber, metal or plastic material, and which is fastened by press-fitting a first end of the cover 201 defining a first opening 201x having a first opening diameter C1 over a free end of a tubular member in the form of the end portion of the outer casing 18 of a derailleur cable 4 so that the entry of water, mud or dust, etc., into an inner cable insertion hole 18a formed in the outer casing 18 can be prevented. 201a indicates a side wall of the main body of the protective cover 201.

A second end of the protective cover main body 201a defining a second opening 201y having a second opening diameter C2 smaller than the first opening diameter C1 is fit over an inner cable 17 with a gap 201b being left between the protective cover main body 201a and the inner cable 17. Moreover, the interior of the protective cover main body 201a is expanded in order to form a space 204 which contains the outer circumferential surface 18b of the end portion of the derailleur cable 4.

Figure 15B:
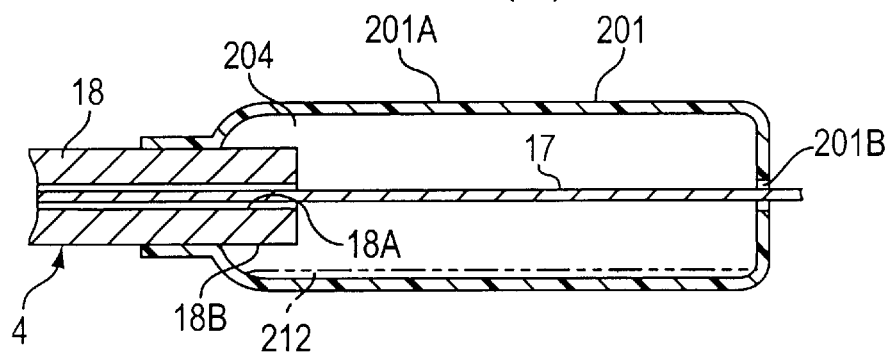

As is shown in FIG. 15(B), even in cases where water such as rain water or dew, etc., invades the interior of the protective cover main body 201a via the gap 201b located at the other end of the protective cover main body 201a and accumulates inside the protective cover main body 201a, the accumulated water 212 can easily be removed by natural evaporation via the gap 201b located at the other end of the protective cover main body 201a. Thus, conditions which would cause soiling of the inner cable 17 inside the protective cover main body 201a are avoided.

Figure 15C:
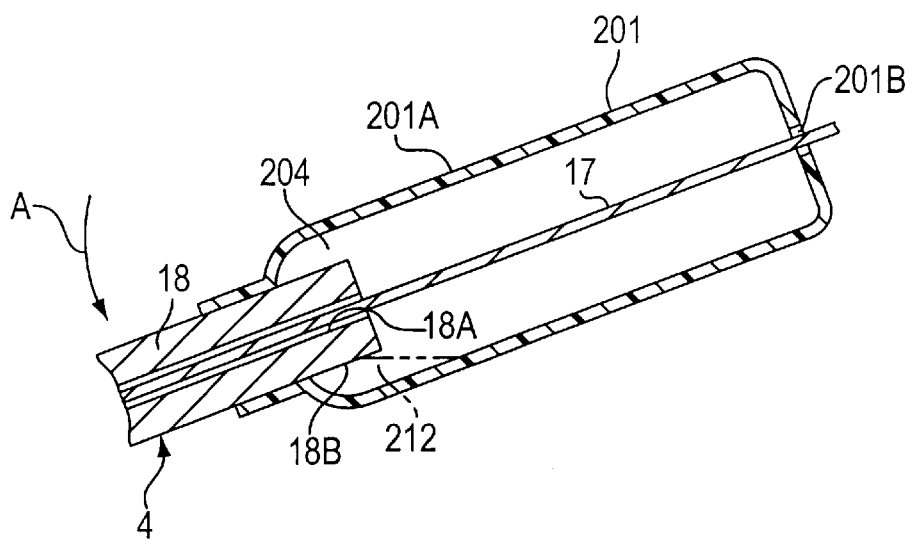

As shown in FIG. 15(C), if the protective cover main body 201a containing accumulated water 212 is unintentionally tilted downward (as indicated by arrow A) in the manner described above, an expanded space 204 which contains the outer circumferential surface 18b of the end portion of the derailleur cable 4 is formed in the protective cover main body 201a, so that although the accumulated water 212 tends to gather in the lower portion of the space 204, the position of the inner cable insertion hole 18a formed in the end portion of the derailleur cable 4 protrudes above the level of the accumulated water, thus preventing the accumulated water from entering the inner cable insertion hole 18a.

Figure 16A:
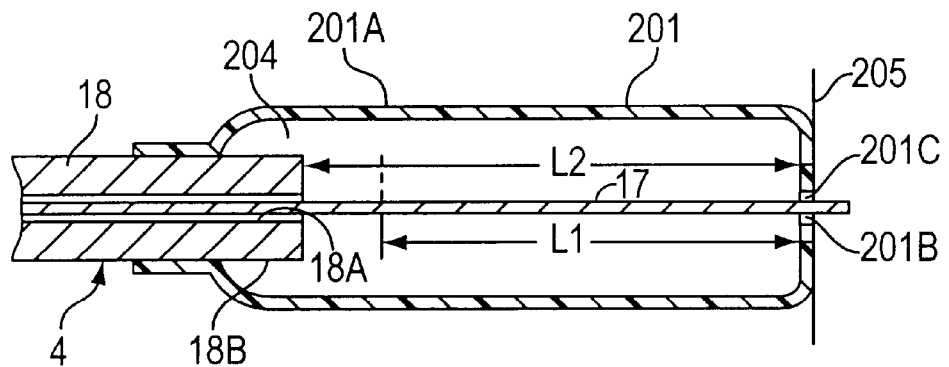
FIG. 16(A) is a cross-sectional view of the protective cap shown in FIG. 1 illustrating selected dimensions.

If desired, the position of the inner cable insertion hole 18a which is installed inside the protective cover 201 can be set at a length (L2) from a base point 205 defined by the second end of the protective cover as shown in FIG. 16(A). If this length (L2) is greater than the length of the reciprocating stroke (L1) of the inner cable 17, then even if water such as rain water or dew, etc., should enter via the opposite tip end (1c) of the protective cover 201 and adhere to the inner cable 17, the water adhering to the inner cable 17 can be reliably prevented from being pulled into the inner cable insertion hole 18a by the reciprocating motion of the inner cable 17. Of course, such dimensions are not absolutely necessary.

Figure 16B:
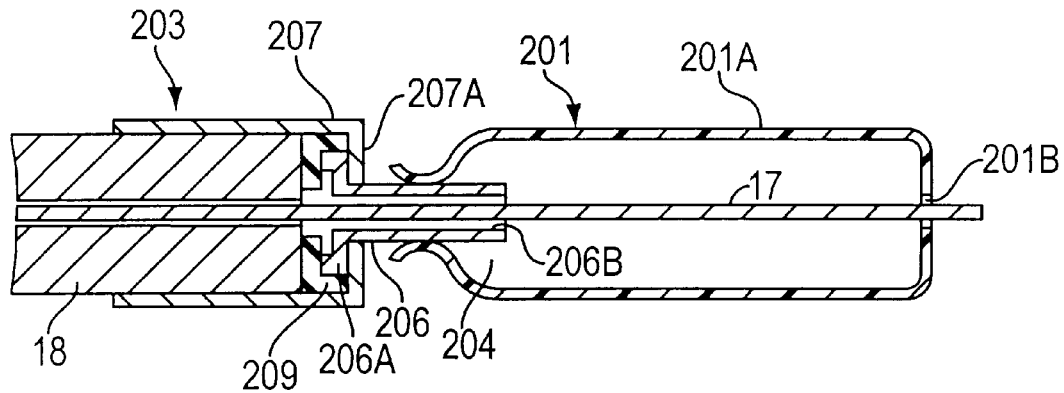
FIG. 16(B) is a cross-sectional view of an alternative embodiment of a protective cap for a control cable according to the present invention.

In an alternative embodiment shown in FIG. 16(B), it is possible to fit a cap assembly 203 together with the protective cover 201 over the end portion of derailleur cable 4. In this embodiment, which is similar to the embodiment shown in FIG. 11, large diameter component 207 is fit over the end portion of the derailleur cable 4. A small diameter component 206 having a flange 206a is clamped between the inward-facing flange part 207a of the large diameter component 207 and an interposed part 209 (formed from a rubber material) which is mounted on the end portion of the outer casing 18 of the derailleur cable 4. The protective cover main body 201a is fastened in place by fitting one end of the protective cover main body 201a over the small diameter component 206. In this case, even if water such as rain water or dew, etc., should enter from the end portion of the small diameter component 206 via the cable insertion hole 206b, the entry of the water into the inner cable insertion hole formed in the end portion of the derailleur cable 4 can be reliably prevented by the tight seal formed between the rear end portion 206a of the small diameter component 206 and the interposed part 209 which is mounted on the end portion of the outer casing 18. In addition, various other advantages are also obtained. For example, the outer diameter of the end portion of the protective cover main body 201a which is fit over the small diameter component 206 can be made smaller than the outer diameter of the derailleur cable. Thus, the outer diameter of the protective cover 201 fastened to the derailleur cable 4 can be made equal to or smaller than the outer diameter of the derailleur cable 4. Consequently, not only can the protective cover 201 be made more compact so that the cost of materials and the cost of shipping can be reduced, but it is also possible to obtain an attractive appearance from a design standpoint.

Figure 17A:
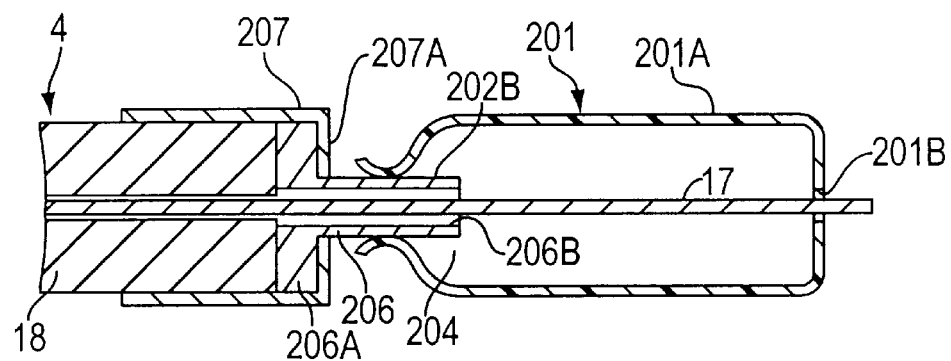
FIGS. 17(A–B) are cross-sectional views of alternative embodiments of the protective cap shown in FIG. 16(B)

Alternatively, as shown in FIG. 17(A), a small diameter component 206 on which a roughly circular flange-form end portion 206a is formed can be mounted on the end portion of the derailleur cable via the large diameter component 207, and one end of the protective cover main body 201a can be press-fit over the tubular body portion of the small diameter component 206. In this case, both the number of parts required and the cost of the parts can be further reduced.

Figure 17B:
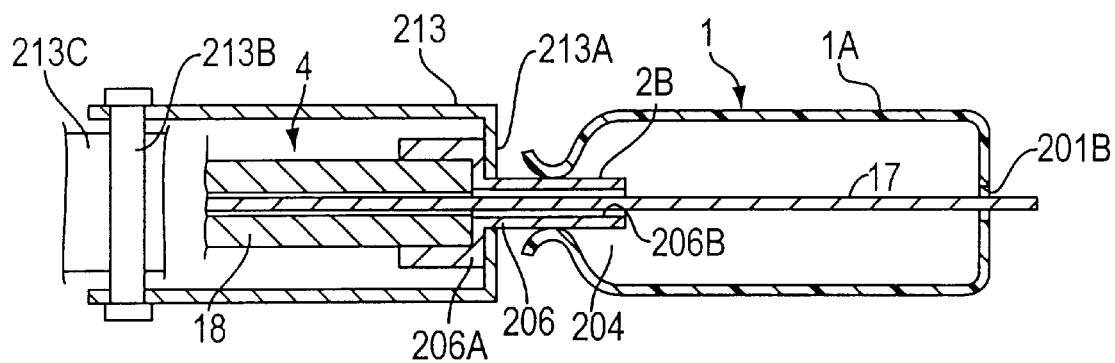

The small diameter component 206 may also be a part whose rear end portion 206a is formed in a shape like that of the large diameter component 207, with the rear end portion 206a being fit directly over the end portion of the derailleur cable 4 as shown in FIG. 17(B). If desired, the tubular body portion of the small diameter component thus mounted may be supported by one end portion 213a of a cable hook 213 which is pivotally mounted via a freely rotating shaft pin 213b on a supporting part 213c which is fastened to a prescribed member. This embodiment is similar to the embodiment shown in FIG. 2. Of course, there are no restrictions on the shape, structure or conditions of use of the small diameter component 206, and such a small diameter component 206 may either be used or omitted.

Figure 18A:
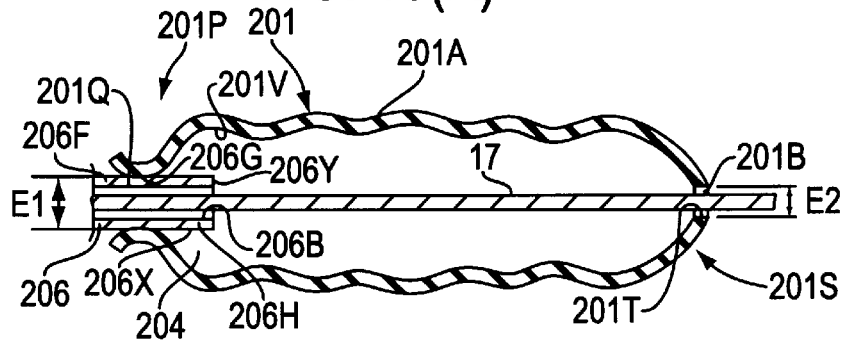
FIGS. 18(A–D) are cross-sectional views of alternative embodiments of a protective cap for a control cable according to the present invention.
Figure 18B:
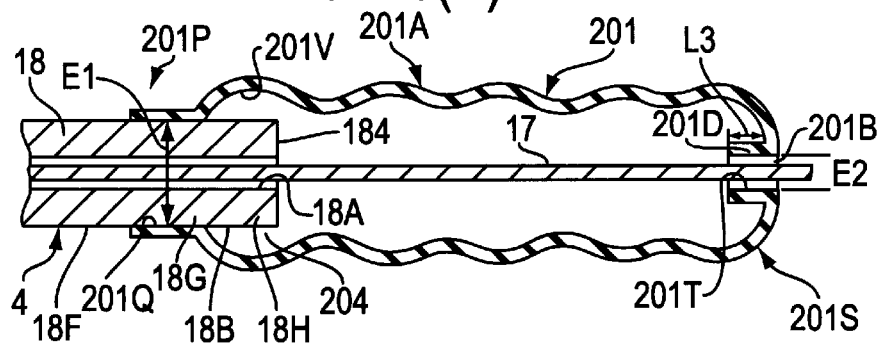

In the above embodiments, the protective cover main body 201a was formed roughly in the shape of a bottle, and one end of the protective cover main body 201a was press-fit over the end portion of the outer casing 18 of the derailleur cable 4, or over a small diameter component 206 mounted on the end portion. However, the shape of the protective cover main body 201a is not limited to a bottle shape. For example, it would also be possible to use a protective cover main body 201a with a body in which a multiple number of protruding portions that are roughly wave-shaped in cross section are lined up in the axial direction as shown in FIG. 18(A). More specifically, protective cover 201 includes a protective cover main body 201a having a first end 201p and a second end 201s. First end 201p defines a first opening 201q having a first opening diameter E1, wherein the first end 201p is structured for sealingly covering the small diameter component 206 which has a constant diameter outer circumferential side surface (wall) 206x and a free end face 206y (FIG. 18(A)) or for sealingly covering the outer casing 18 which has an outer circumferential side surface (wall) 18b and a free end face 18y (FIG. 18(B)). Second end 201s defines a second opening 201t having a second opening diameter E2. A side wall 201v of protective cover 201 covers an exposed portion of the inner cable 17 covered by neither the outer casing 18 nor the small diameter component 206. The side wall 201v defines a space, and the side surface 206x and free end face 206y of the small diameter component 206 or the side surface 18b and free end face 18y of the outer casing 18 projects into the space so that the space is disposed around the side surfaces 206x and 18b and between side surfaces 206x and 18b and side wall 201v. As seen in FIG. 18(A), the outer circumferential side surface 206x of small diameter component 206 has a constant diameter from a first portion 206f before contact with the first end 201p of the protective cover 201, through a second portion 206g in contact with the protective cover 201, and through a third portion 206h extending from the second portion 206g to the free end face 206y, wherein the second portion 206g is disposed between the first portion 206f and the third portion 206h. Similarly, as seen in FIG. 18(B), the outer circumferential side surface 18b of outer casing 18 has a constant diameter from a first portion 18f before contact with the first end 201p of the protective cover 201, through a second portion 18g in contact with the protective cover 201, and through a third portion 18h extending from the second portion 18g to the free end face 18y, wherein the second portion 18g is disposed between the first portion 18f and the third portion 18h. In short, in the present embodiments, as long as [a] one end of the protective cover main body 201a is fastened to the end portion of the derailleur cable 4, [b] the other end of the protective cover main body 201a is fit over the inner cable 17 with a gap 201b left between the protective cover main body 201a and the inner cable 17, and [c] a space 204 which prevents water from entering the inner cable insertion hole 18a is formed inside the protective cover main body 201a, there are no restrictions on the concrete shape of the protective cover main body 201a.

Figure 18C:
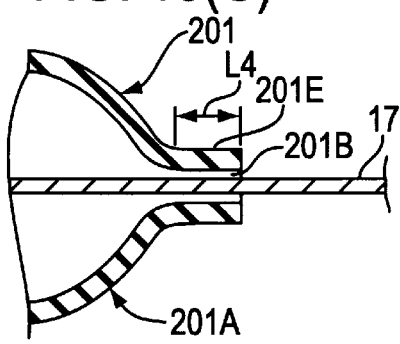

If desired, the gap 201b in the other end of the protective cover main body 201a may be formed by the inner diameter of a hole in a tubular part 201d which protrudes toward the interior of the protective cover main body 201a by a prescribed dimension (L3) as shown in FIG. 18(B). Alternatively, as is shown in FIG. 18(C), the gap 201b may be formed by the inner diameter of a hole in a tubular part 201e which protrudes toward the outside of the protective cover main body 201a by a prescribed dimension (L4). In this case, an additional advantage is obtained in that the entry of mud, water or dust, etc., into the interior of the protective cover main body 201a is further prevented by the tubular part.

Figure 18D:
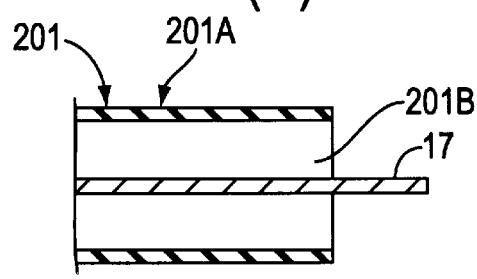

Alternatively, the gap 201b may also be formed by the inner diameter of an opening formed in the other end of the protective cover main body 201a with roughly the same diameter as the inner diameter of the body portion of the protective cover main body 201a as shown in FIG. 18(D). Thus, it goes without saying that there are no restrictions on the concrete position of formation, size or shape of the gap 201b formed in the other end of the protective cover main body 201a, and that there are likewise no restrictions on the length dimension of the tubular part formed along the inner cable 17, or on the presence or absence of such a tubular part.

Figure 19A:
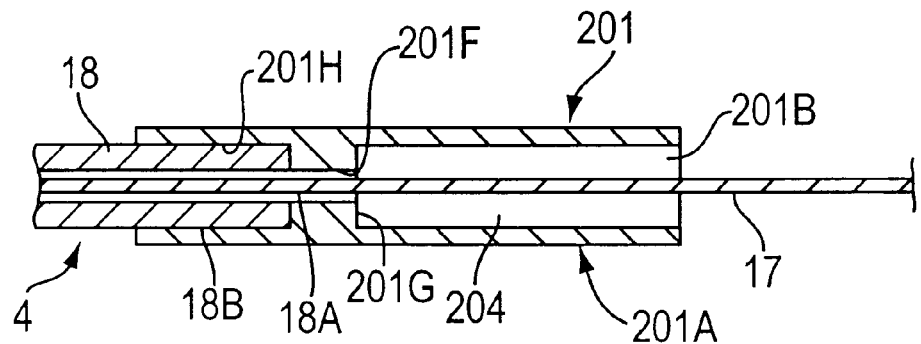
FIGS. 19(A–C) are cross-sectional views of alternative embodiments of a protective cap for a control cable according to the present invention.
Figure 19B:
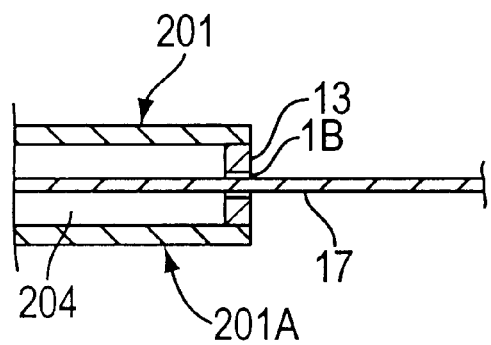
Figure 19C:
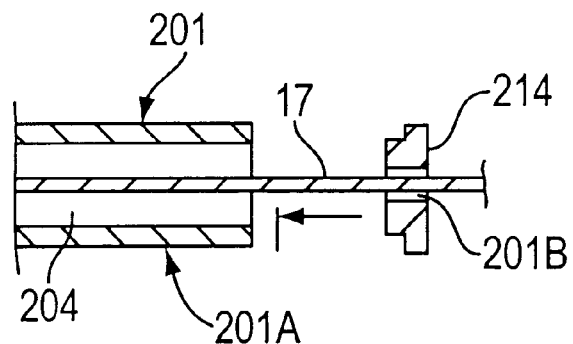

FIG. 19(A) shows an embodiment where [a] the protective cover main body 201a is formed in a tubular shape, [b] a recessed portion 201h into which the outer circumferential surface of the end portion of the outer casing 18 can be inserted is formed in one end of the protective cover main body 201a, [c] a space 204 is formed in the other end of the protective cover main body 201a, and [d] a wall 201g which has a through-hole 201f through which the inner cable 17 is passed is formed between the first end of the protective cover main body 201a and the second end of the protective cover main body 201a. In this embodiment, the protective cover main body 201a can be mounted with an increased tightness so that the unintended entry of water from the side of the outer casing 18 is completely prevented by the recessed portion 201h. Additionally, even in cases where water enters from the other end of the protective cover main body 201a and adheres to the inner cable 17, the adhering water can be removed by causing the inner cable 17 to slide through the through-hole 201f in the wall 201g, thus preventing the water from reaching the inner cable insertion hole 18a. It would also be possible to install a ring-form guide part 213 (e.g., formed from a plastic material) with approximately the same diameter as the inner diameter of the body portion of the protective cover main body 201a on the inside wall surfaces of the opening formed in the other end of the protective cover main body 201a as shown in FIG. 19(B), or to mount a cover part 214 equipped with a hole in the opening formed in the other end of the protective cover main body 201a as shown in FIG. 18(C), so that the gap 201b formed in the other end of the protective cover main body 201 a is formed in these respective cases by the hole through which the inner cable 17 is passed.

Figure 20A:
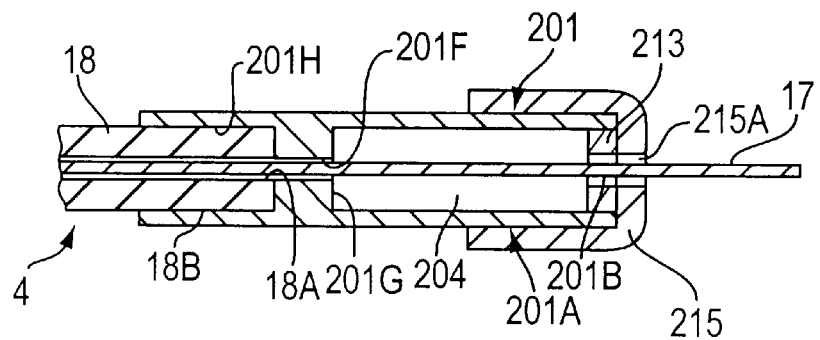
FIGS. 20(A–C) are cross-sectional views of alternative embodiments of a protective cap for a control cable according to the present invention.
Figure 20B:
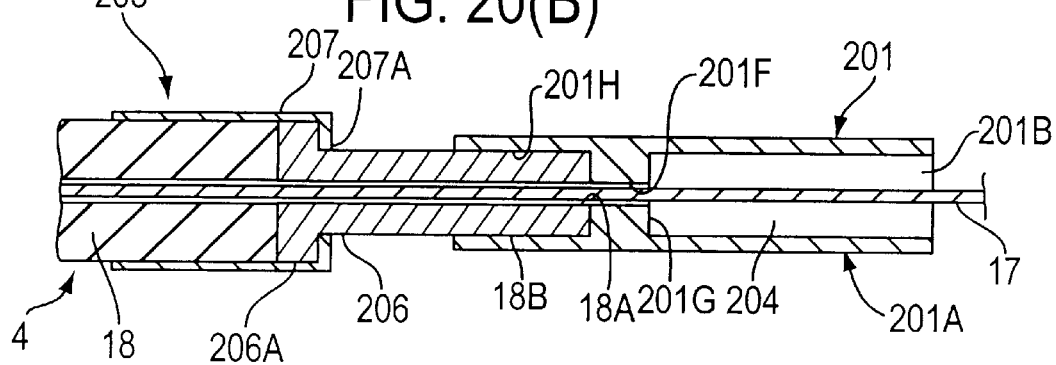

In yet further embodiments shown in FIGS. 20(A) and 20(B), it would also be possible to use the protective cover main body 201a with the other end of the protective cover main body 201 a mounted in a prescribed receiving member 215 which has a gap 215a that allows the inner cable 17 to pass through (as shown in FIG. 20(A)), or to fit one end of the protective cover main body 201a over a small diameter component 206 mounted in the end portion of a large diameter component 207 of a cap assembly 203 as shown in FIG. 20(B).

Figure 20C:
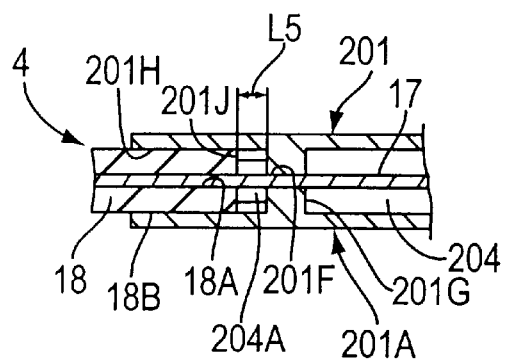

FIG. 20(C) shows a case where [a] a wall 201g which has a through-hole 201f through which the inner cable 17 is passed is installed between the first end and the other end of the protective cover main body 201a, and [b] a recessed portion 201h which allows the insertion of the outer circumferential surface of the end portion of the outer casing 18 is formed in the first end of the protective cable main body 201a as described above. In this case, it is also possible to form a circumferential step part 201j which has a prescribed width dimension (indicated by L5) on the inner circumferential wall portion of the recessed portion 201h of the protective cover main body 201a so that the end portion of the outer casing 18 which is inserted into the recessed portion 201h does not contact the wall 201g on the side of the recessed portion 201h, but is instead separated from the wall 201g by a prescribed distance. With this construction, even if water should somehow enter via the through-hole 201f, the invading water can be reliably prevented from reaching the inner cable insertion hole 18a directly by the space 204a formed by the step part 201j. In addition, the frictional resistance between the reciprocating inner cable 17 and the through-hole 201f can be lowered so that the inner cable 17 can be operated with a smaller force.

Figure 21A:
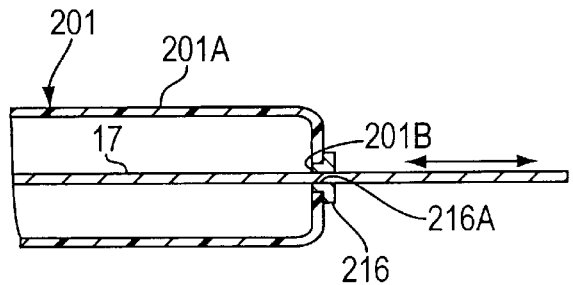
FIGS. 21(A–C) are cross-sectional views of alternative embodiments of a protective cap for a control cable according to the present invention.
FIG. 21(D) is cross-sectional view of alternative embodiment of a protective cap.
Figure 21B:
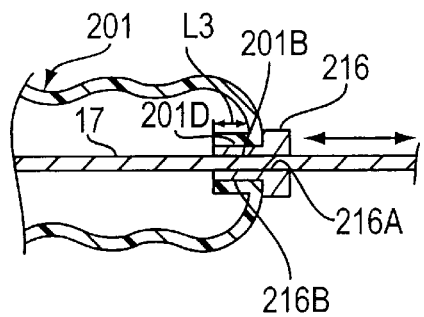
Figure 21C:
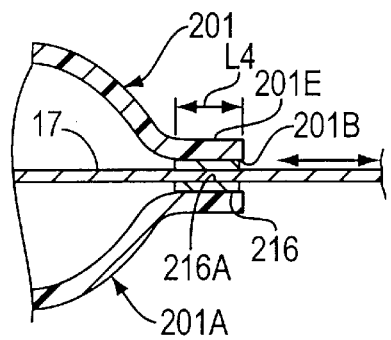

As shown in FIG. 21(A), it would also be possible to install on the other end of the protective cover main body 201a a mounting part 216 equipped with a hole 216a which has a diameter that allows sliding motion of the inner cable 17 that performs a reciprocating motion through the gap 201b formed in the other end of the protective cover main body 201a. With this structure, any adhering water, mud or dust, etc., which attempts to enter via the gap 201b together with the reciprocating inner cable 17 can be removed by a wiping action that is generated when the inner cable 17 slides through the hole 216a. Furthermore, in cases where the gap 201b formed in the other end of the protective cover main body 201a is formed by the inner diameter of a hole in a tubular part 201d which protrudes toward the interior of the protective cover main body 201a by a prescribed dimension (L3), a sliding trunk part 216b which extends from the other end of the protective cover main body 201a to the end of the tubular part 201d may be formed on the mounting part 216 as shown in FIG. 21(B). In cases where the gap 201b is formed by the inner diameter of a hole in a tubular part 201e which protrudes toward the outside of the protective cover main body 201a by a prescribed dimension (L4), the mounting part 216 may be mounted on the inner circumferential wall surface of the tubular part 201e as shown in FIG. 21(C).

Figure 21D:
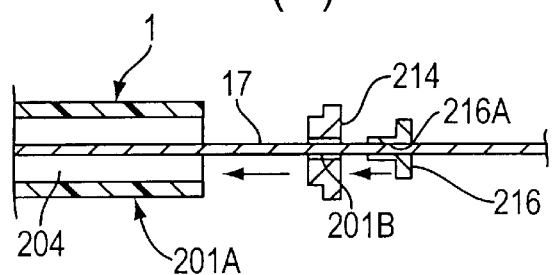

Alternatively, the mounting part 216 may be formed so that the mounting part 216 can be inserted into a gap 201*b* formed in a hole-equipped cover part 214 mounted in the opening formed in the other end of the protective cover main body 201*a* as shown in FIG. 21(D). In all of these cases, any water, mud or dust, etc. adhering to the inner cable which attempts to enter via the gap 201*b* can be removed by a wiping action that is generated when the inner cable 17 slides through the hole 216*a*. Of course, there are no restrictions on the mounting part 216 in terms of concrete shape, size or structure used for mounting on the other end of the protective cover main body 201*a*, etc.

In the embodiments described in FIGS. 15–21 above, the protective cover was formed roughly in the shape of a bottle from a plastic material. However, the protective cover does not necessarily have to be formed in such an approximate bottle shape. It would also be possible to form the protective cover in the shape of a barrel or drum. In such cases, it would be possible to accommodate an even larger amount of invading water on a temporary basis. In cases where the protective cover main body is formed from a molding which does not expand or contract, expansion and contraction of the protective cover main body can be reliably prevented even when the inner cable is caused to perform a reciprocating motion during the remote control operation. In this case no negative pressure is generated.

In the embodiments described above, one end of the protective cover was fastened in place by being fit over the end portion of the outer casing. It would also be possible to fasten the end of the protective cover in place by screwing, welding or bonding using an adhesive agent, etc., with the end of the protective cover either being fit over the outer circumference of the outer tube or inserted into the interior of the outer tube. In such cases, the protective cover can be more firmly fastened to the end portion of the outer tube.

It would also be possible to form burring or curling in the opening rim portion of the gap formed in the other end of the protective cover. In such cases, water gathering on the opening rim portion of the gap can easily be prevented from entering the interior of the protective cover by surface tension acting via the burring or curling.

In the embodiment described in FIG. 16(B), it is not necessary that the interposed part 209 be formed from a rubber material. It would also be possible to form the part from a hard or soft plastic, or to use a metal ring-form part. In addition, there are no restrictions on the material or shape, etc., of the small diameter component 206.

FIG. 22 shows an alternative embodiment of a protective cap system according to the invention for bicycle control cables where the control cables extend along the top tube 85 of the bicycle. In this embodiment, a rear derailleur cable 4 and a front derailleur cable 31 are connected from the top tube 85 to the rear derailleur 3 and front derailleur 30. Cap receivers 152 and 156 are fixed to the slanted frame 151.

A nose cap 153 is inserted into the cap receiver 152. The nose cap 153 has the same structure and function as the nose cap 10 in FIG. 2. The cap receiver 156 is placed opposite the cap receiver 152 is fixed to the slanted frame 151. One end of the protective cover 154 is fitted to the small diameter component 155 of the nose cap 153, with the other end fitted to the small diameter component 158 of the nose cap 157.

A shield cap 159 having the same structure and function as the shield cap 62 may be fitted to the other end of the rear derailleur cable 150. The shield cap 159 is fitted to the cable adjusting barrel unit (not shown in figure) of the rear derailleur 3, and the end of the inner cable 17 is fixed with the cable fixing bolt unit (not shown in figure) of the rear derailleur 3. Alternatively, the structure shown in FIG. 5 may be used.

The front derailleur 30 is connected via the front derailleur cable 31 to the front shift lever unit (not shown in figure) located on the handle bars. At an intermediate point along the front derailleur cable 31, the outer casing 34 is removed. The outer casing 34 surrounds and guides the inner cable 33. A cap receiver 166 is fixed to the top tube 85, and a nose cap 163 having a small diameter component 164 is inserted into the cap receiver 166. One end of the outer casing 34 is fitted to the nose cap 163, and the other end of the outer casing 34 (at the end of the front shift lever unit) may be fitted to a shield cap 173. The structure of the shield cap 173 is the same as the shield cap 62. The rear derailleur cable 4 has a similar structure.

A cap receiver 170 is integrally fixed to the top tube 85. The structure and function of the cap receiver 170 are the same as that of the cap receiver 8, making a description of the structure and function unnecessary. A nose cap 171 having a small diameter component 172 is inserted into the cap receiver 170. The two ends of the protective cover 165 are fitted to the small diameter component 164 of the nose cap 163 and the small diameter component 172 of the nose cap 171, respectively.

A cap receiver 175 is fixed to the vertical frame 70. A nose cap 176 having a small diameter component 177 is inserted into the cap receiver 175. The two ends of the front derailleur cable 31 are fitted to the nose cap 176 in the cap receiver 170 and to the nose cap 171 in the cap receiver 175. The inner cable 33 emerges from the tip of the small diameter component 177 of the nose cap 176 and is connected to the front derailleur 30. There is a slight possibility of foreign objects penetrating from the tip of the small diameter component 177 of the nose cap 176. Thus, the bellows tube 71 shown in FIG. 7 may be connected between the small diameter component 177 and the inner cable 33 Alternatively, the shield cap 62 (FIG. 9) may be used instead of the nose cap 176, or the protective cap 80 (FIG. 8) may be used in conjunction with nose cap 176.

Figure 23:
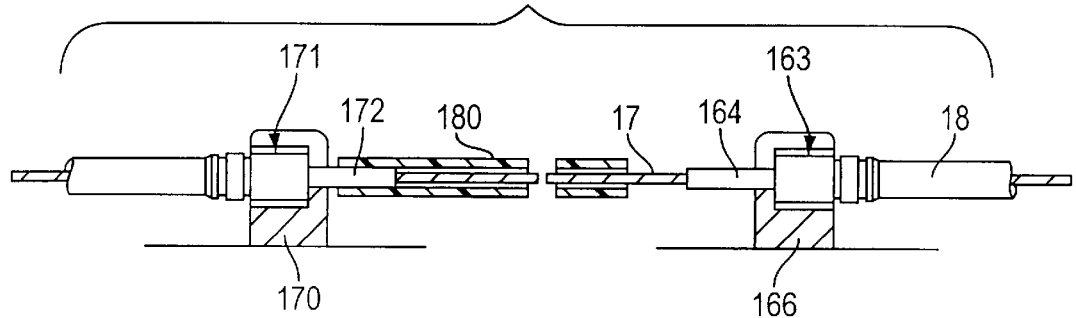
FIGS. 23–25 are partial cross sectional views of alternative embodiments of a protective cap system used in the embodiment shown in FIG. 22.

FIG. 23 is a partial cross sectional view of an alternative embodiment of a protective cap system which may be used in the embodiment shown in FIG. 22. This embodiment, and the embodiments described below, may be used wherever there are opposed cap retainers. In the embodiment shown in FIG. 22, the protective covers 154 and 165 had to be cut to the proper length. The embodiment shown in FIG. 23, however, includes a protective cover 180 of shorter length which can still be used without being able to be fitted to the small diameter component 164 of the nose cap 163. The open end of protective cover 180 preferably should be placed in an upper location of the frame, where it is more difficult for foreign objects to penetrate.

Figure 24:
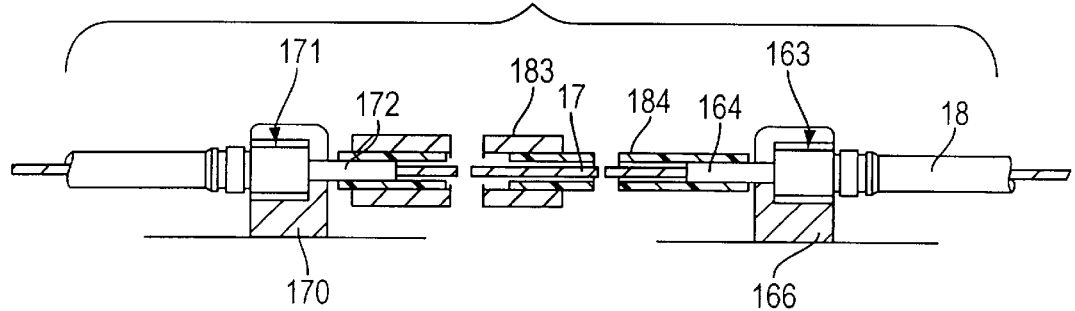

FIG. 24 is a partial cross sectional view of another alternative embodiment of a protective cap system which may be used in the embodiment shown in FIG. 22 The embodiment shown in FIG. 24 involves the use of two connected protective covers. A large diameter protective cover 183 with a diameter greater than that of a protective cover 184 is fitted and connected to the latter for use.

Figure 25:
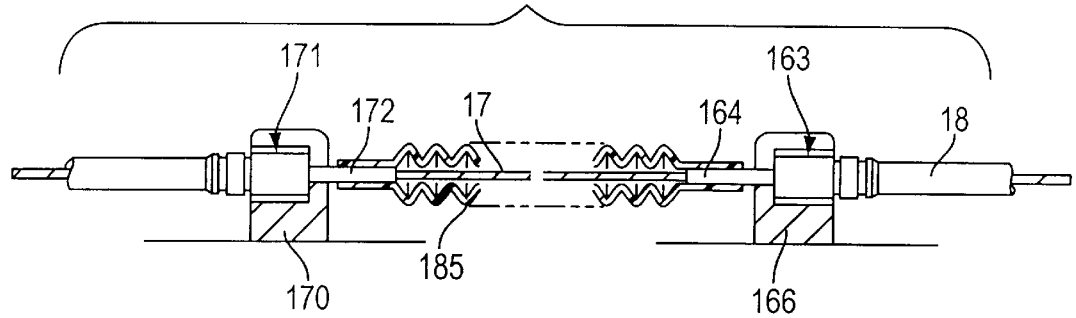

FIG. 25 is a partial cross sectional view of another alternative embodiment of a protective cap system which may be used in the embodiment shown in FIG. 22 The embodiment shown in FIG. 25 is an example involving the use of a bellows type of protective cover 185. The protective cover 185 is made of rubber or a synthetic resin elastomer.

Because of the bellows configuration, it can be extended and retracted, allowing the length to be adjusted.

While the above is a description of many embodiments of the present invention, even further modifications may be employed without departing from the spirit and scope of the present invention. For example, one end of the bellows tube 55 in the embodiment shown in FIG. 5 above was fitted to and fixed to the small diameter component 53 of the nose cap 39. Also, one end of the bellows tube 71 in the embodiment shown in FIG. 7 was fitted around and fixed to one end of the protective cover 38. Alternatively, the bellows tube may be directly attached to the outer casing of the respective derailleur cable when no nose cap 39 or protective cover 38 is used. Any of the described caps, bellows or covers may be used at any location on the control cables as desired, and the features of one embodiment may be used in place of features of other embodiments. Furthermore, the brake cables may be furnished with the same type of system. Since this would be essentially the same as the system, no detailed description should be necessary.

Thus, the scope of the invention should not be limited by the specific structures disclosed. Instead, the true scope of the invention should be determined by the following claims.

What is claimed is:

1. An apparatus for preventing contamination of a bicycle control cable having an inner cable (17), the apparatus comprising:
    a tubular member (18,206) for receiving the inner cable (17) therethrough, the tubular member (18,206) having an outer circumferential side surface (18b,206x) and a free end face (18y,206y);
    a flexible protective cover (201) including:
        a first end (201p) defining a first opening (201q) having a first opening diameter (E1), wherein the first end (201p) is sealingly disposed over the tubular member (18,206) by contacting the tubular member (18,206);
        a second end (201s) defining a second opening (201t) having a second opening diameter (E2); and
        a side wall (201v) defining a space, wherein the outer circumferential side surface (18b,206x) and the free end face (18y,206y) of the tubular member (18,206) projects into the space so that the space is disposed around the outer circumferential side surface (18b, 206x) of the tubular member (18,206) between the outer circumferential side surface (18b,206x) of the tubular member (18,206) and the side wall (201v); and
    wherein the outer circumferential side surface (18b,206x) of the tubular member (18,206) has a constant diameter from a first portion (18f,206f) before contact with the first end (201p) of the protective cover, through a second portion (18g,206g) in contact with the protective cover (201), and through a third portion (18h,206h) extending from the second portion (18g,206g) to the free end face (18y,206y), wherein the second portion (18g,206g) is disposed between the first portion (18f, 206f) and the third portion (18h,206h).

2. The apparatus according to claim 1 wherein the tubular member (18,206) is formed of metal.

3. The apparatus according to claim 1 wherein the protective cover (201) is formed of rubber.

4. The apparatus according to claim 1 wherein the second opening diameter (E2) is smaller than the first opening diameter (E1).

5. The apparatus according to claim 1 wherein the protective cover (201) has a wave shape.

6. The apparatus according to claim 1 wherein the protective cover (201) is formed of resin.

7. An apparatus for preventing contamination of a bicycle control mechanism comprising:
    a control cable including an inner cable (17);
    a tubular member (18,206) for receiving the inner cable (17) therethrough, the tubular member (18,206) having an outer circumferential side surface (18b,206x) and a free end face (18y,206y), wherein the inner cable passes through the tubular member (18,206) and extends from the free end face (18y,206y);
    a flexible protective cover (201) including:
        a first end (201p) defining a first opening (201q) having a first opening diameter (E1), wherein the first end (201p) is sealingly disposed over the tubular member (18,206) by contacting the tubular member (18,206);
        a second end (201s) defining a second opening (201t) having a second opening diameter (E2); and
        a side wall (201v) covering an exposed portion of the inner cable not covered by the tubular member (18,206), wherein the side wall defines a space, and wherein the outer circumferential side surface (18b, 206x) and the free end face (18y,206y) of the tubular member (18,206) projects into the space so that the space is disposed around the outer circumferential side surface (18b,206x) of the tubular member (18, 206) between the outer circumferential side surface (18b,206x) of the tubular member (18,206) and the side wall (201v); and
    wherein the outer circumferential side surface (18b,206x) of the tubular member (18,206) has a constant diameter from a first portion (18f,206f) before contact with the first end (201p) of the protective cover, through a second portion (18g,206g) in contact with the protective cover (201), and through a third portion (18h,206h) extending from the second portion (18g,206g) to the free end face (18y,206y), wherein the second portion (18g,206g) is disposed between the first portion (18f, 206f) and the third portion (18h,206h).

8. The apparatus according to claim 7 wherein the tubular member (18) forms an outer casing of the control cable.

9. The apparatus according to claim 7 wherein the second opening diameter (E2) is less than the first opening diameter (E1).

10. The apparatus according to claim 9 wherein a gap (201b) is defined between the second end (201s) of the protective cover (201) and the inner cable (17).

11. An apparatus for use with a control cable including an inner cable (17) for preventing contamination of the control cable, the apparatus comprising:
    a tubular member (18,206) for receiving the inner cable (17) therethrough, the tubular member (18,206) having an outer circumferential side surface (18b,206x) and a free end face (18y,206y), so that the inner cable (17) passes through the tubular member (18,206) and extends from the free end face (18y,206y) thereof;
    a flexible protective cover (201) including:
        a first end (201p) defining a first opening (201q) having a first opening diameter (E1), wherein the first end (201p) is structured for sealingly covering the tubular member (18,206) by contacting the tubular member (18,206);
        a second end (201s) defining a second opening (201t) having a second opening diameter (E2); and a side wall (201*v*) for covering an exposed portion of the inner cable not covered by the tubular member (18,206), wherein the side wall (201*v*) defines a space, and wherein the outer circumferential side surface (18*b*,206*x*) and the free end face (18*y*,206*y*) of the tubular member (18,206) projects into the space so that the space is disposed around the outer circumferential side surface (18*b*,206*x*) of the tubular member (18,206) between the outer circumferential side surface (18*b*,206*x*) of the tubular member (18,206) and the side wall (201*v*); and wherein the outer circumferential side surface (18*b*,206*x*) has a constant diameter from a first portion (18*f*,206*f*) before contact with the first end (201*p*) of the protective cover, through a second portion (18*g*,206*g*) in contact with the protective cover (201), and through a third portion (18*h*,206*h*) extending from the second portion (18*g*,206*g*) to the free end face (18*y*,206*y*), wherein the second portion (18*g*,206*g*) is disposed between the first portion (18*f*,206*f*) and the third portion (18*h*,206*h*).

* * * * *